United States Patent
Aebli et al.

(10) Patent No.: US 8,030,259 B2
(45) Date of Patent: Oct. 4, 2011

(54) ALKYLATED PANA AND DPA COMPOSITIONS

(75) Inventors: Beat Michael Aebli, Basel (CH); Samuel Evans, Marly (CH); Marc Ribeaud, Delémont (CH); David Eliezer Chasan, Teaneck, NJ (US)

(73) Assignee: Ciba Speciality Chemicals Corp., Tarrytown, NY (US)

( * ) Notice: Subject to any disclaimer, the term of this patent is extended or adjusted under 35 U.S.C. 154(b) by 1068 days.

(21) Appl. No.: 10/594,379

(22) PCT Filed: Mar. 23, 2005

(86) PCT No.: PCT/EP2005/051324
§ 371 (c)(1),
(2), (4) Date: Sep. 26, 2006

(87) PCT Pub. No.: WO2005/097728
PCT Pub. Date: Oct. 20, 2005

(65) Prior Publication Data
US 2008/0274925 A1 Nov. 6, 2008

Related U.S. Application Data

(60) Provisional application No. 60/558,801, filed on Apr. 1, 2004.

(51) Int. Cl.
*C10M 133/12* (2006.01)
*C10M 141/06* (2006.01)

(52) U.S. Cl. ...................................................... 508/563

(58) Field of Classification Search .................. 508/563
See application file for complete search history.

(56) References Cited

U.S. PATENT DOCUMENTS

| | | | |
|---|---|---|---|
| 2,530,769 A | 11/1950 | Hollis | 252/401 |
| 2,943,112 A | 6/1960 | Popoff et al. | 260/576 |
| 3,944,492 A | 3/1976 | Wheeler | |
| 5,186,852 A | 2/1993 | Ishida et al. | 252/50 |
| 6,315,925 B1 | 11/2001 | Aebli et al. | 252/401 |
| 6,410,490 B1 * | 6/2002 | Reyes-Gavilan et al. | 508/243 |
| 2002/0065201 A1 * | 5/2002 | Ribeaud et al. | 508/375 |
| 2010/0099589 A1 | 4/2010 | Ryan et al. | |

FOREIGN PATENT DOCUMENTS

| | | |
|---|---|---|
| EP | 0387979 A1 | 9/1990 |
| EP | 0606863 | 7/1994 |
| EP | 2055763 A1 | 6/2009 |
| FR | 2832417 A1 | 5/2003 |
| GB | 2384245 | 7/2003 |
| TW | 157121 A1 | 5/1991 |
| WO | 2005097728 A1 | 10/2005 |
| WO | 2010017030 A1 | 2/2010 |

OTHER PUBLICATIONS

English Language Abstract for EP 0606863, Jul. 20, 1994.
Patent Abstracts of Japan Publication No. 62181396, Aug. 8, 1987.
P. Sniegoski, Journal of chromatographic Science, vol. 15, Aug. 1977, pp. 328-329.
English language translation of Abstraction of FR Publication No. 2832417 from European Patent Office; dated Dec. 20, 2010; 1 page.
"Aminic & Phenolic Antioxidants—Synergistic or Antagonistic?", STLE Session 2C—Lubrication Fundamentals II; by D. Chasan, S. Dargar, and P. Rabbat; Ciba Corporation; May 19, 2008.
Novel Compostion of Para-Butylated and Octylated, Ortho-Ethylated Diphenylamines, Jul. 5, 1985.

* cited by examiner

*Primary Examiner* — Glenn Caldarola
*Assistant Examiner* — Vishal Vasisth
(74) *Attorney, Agent, or Firm* — Howard & Howard Attorneys PLLC

(57) ABSTRACT

The invention relates to a composition comprising a mixture of alkylated N-α-naphthyl-Nphenylamine (PANA) and alkylated diphenylamine (DPA), the product obtainable by alkylating PANA or a mixture of PANA and DPA with alkenes and the process for alkylating PANA or a mixture of PANA and DPA with alkenes. The compositions according to the present invention have an outstanding anti-oxidative action, which can be demonstrated by established test methods.

16 Claims, No Drawings

ALKYLATED PANA AND DPA COMPOSITIONS

This application is a 371 of PCT/EP2005/051324, filed Mar. 23, 2005, which claims benefit of 60/558,801 filed Apr. 1, 2001.

The invention relates to a composition comprising a mixture of alkylated N-α-naphthyl-N-phenylamine (PANA) and alkylated diphenylamine (DPA), the product obtainable by alkylating PANA or a mixture of PANA and DPA with alkenes and the process for alkylating PANA or a mixture of PANA and DPA with alkenes.

Additives are added to numerous organic products widely used in engineering, for example to lubricants, hydraulic fluids, metal-working fluids, fuels or polymers, to improve their performance properties. In particular, there is a need for additives that effectively inhibit the oxidative, thermal and/or light induced degradation of these products. This results in a considerable increase of the utility of these products.

U.S. Pat. No. 2,943,112 discloses anti-oxidants from the group of the alkylated diphenylamines that are prepared by reaction of diphenylamine with alkenes in the presence of mineral acids and large quantities of acid clays as catalysts. Alkylation of the diphenylamine with alkenes, for example nonene, results in mixtures of mono- and di-alkylated diphenylamine. In that process, relatively large quantities of the starting material, generally from 6 to 12% diphenylamine, are not reacted, which reduces the antioxidative efficacy of the alkylated diphenylamines and results in the deposition of sludge and imparts undesirable toxic properties to the product. The subsequent reaction with additional alkenes, e.g. styrene or α-methylstyrene, is proposed as an alternative to the distillative separation of the starting material from the products.

French Patent Specification 1 508 785 discloses the preparation of a mixture of 80% dinonyidiphenylamine and 15% nonyidiphenylamine in the presence of Friedel-Crafts catalysts of the aluminium chloride type, but that mixture still has a diphenylamine content of 2% (see therein the information in Example 2). The preparation of that mixture is especially disadvantageous since it is contaminated by traces of chlorine, metal compounds and undesirable by-products, e.g. N-alkylated diphenylamines and diphenylamines alkylated in the 2- and 2'-positions, is black in colour and is very viscous.

U.S. Pat. No. 6,315,925 discloses the alkylation reaction of diphenylamine with an excess of none or a mixture of isomeric nonenes in the presence of 2.0 to 25.0% by weight, based on diphenylamine of an acid day and the absence of a free protonic acid.

European Patent Application 387 979 discloses a composition comprising p,p'-branched dioctyldiphenylamine and N-p-branched octylphenyl-α-naphthylamine. The Comparative Example 2 of that reference reveals that the composition (1% of each component) is partially insoluble in purified mineral oil and poly-α-olefin oil.

The present invention relates to a composition of alkylated diphenylamines that has improved properties, such as solubility in mineral oil, for the intended technical applications. The improvement is achieved by mixing a N-α-naphthyl-N-phenylamine (PANA) alkylated with at least one substituent selected from the group consisting of branched nonyl, 1-phenylethyl and 2-phenyl-2-propyl with a diphenylamine alkylated with at least one, preferably two, substituents selected from the group consisting of tert-butyl, branched octyl, branched nonyl, 1-phenylethyl and 2-phenyl-2-propyl.

The invention relates to a composition which comprises
A) An additive mixture that essentially consists of
   a) At least one compound:

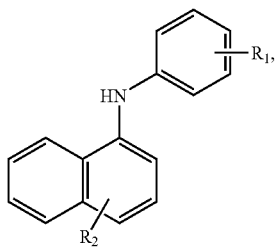

(I)

wherein one of $R_1$ and $R_2$ independently of one another represents hydrogen or a hydrocarbon radical selected from the group consisting of branched nonyl, 1-phenylethyl and 2-phenyl-2-propyl and the other one represents a hydrocarbon radical selected from the group consisting of branched nonyl, 1-phenylethyl and 2-phenyl-2-propyl; and b) At least one compound:

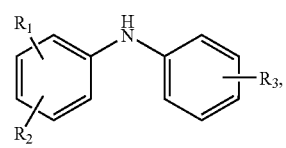

(II)

wherein $R_1$ and $R_2$ independently of one another represent hydrogen or a hydrocarbon radical selected from the group consisting of tert-butyl, branched octyl, branched nonyl, 1-phenylethyl and 2-phenyl-2-propyl; and $R_3$ represents a hydrocarbon radical selected from the group consisting of tert-butyl, branched octyl, branched nonyl, 1-phenylethyl and 2-phenyl-2-propyl; and B) A composition of matter susceptible to oxidative, thermal or light induced degradation. claim 1

According to a preferred embodiment the invention relates to a composition which comprises
A) An additive mixture which essentially consists of
   a) At least one compound:

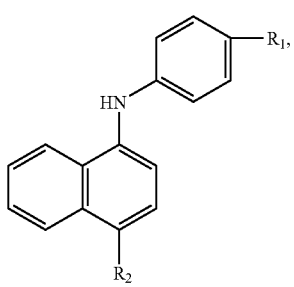

(I')

wherein one of $R_1$ and $R_2$ independently of one another represents hydrogen or a hydrocarbon radical selected from the group consisting of branched nonyl, 1-phenylethyl and 2-phenyl-2-propyl and the other one represents a hydrocarbon radical selected from the group consisting of branched nonyl, 1-phenylethyl and 2-phenyl-2-propyl or an isomer thereof; and b) At least one compound:

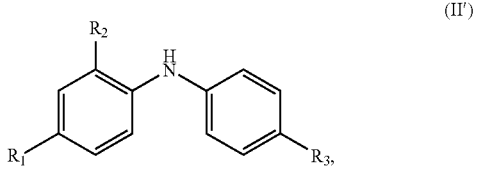

(II')

wherein $R_1$ and $R_2$ independently of one another represent hydrogen or a hydrocarbon radical selected from the group consisting of tert-butyl, branched octyl, branched nonyl, 1-phenylethyl and 2-phenyl-2-propyl; and $R_3$ represents a hydrocarbon radical selected from the group consisting of tert-butyl, branched octyl, branched nonyl, 1-phenylethyl and 2-phenyl-2-propyl or an isomer thereof; and B) A composition of matter susceptible to oxidative, thermal or light induced degradation. claim 2

According to a particularly preferred embodiment the composition comprises an additive mixture that essentially consists of a) At least one compound (I'), wherein one of $R_1$ and $R_2$ independently of one another represents hydrogen or a hydrocarbon radical selected from the group consisting of 2,4-dimethyl-2-heptyl, 1-phenylethyl and 2-phenyl-2-propyl and the other one represents a hydrocarbon radical selected from the group consisting of 2,4-dimethyl-2-heptyl, 1-phenylethyl and 2-phenyl-2-propyl; and b) At least one compound (II'), wherein $R_1$ and $R_2$ independently of one another represent hydrogen or a hydrocarbon radical selected from the group consisting of tert-butyl, 2,4,4-trimethyl-2-pentyl, 2,4-dimethyl-2-heptyl, 1-phenylethyl and 2-phenyl-2-propyl; and $R_3$ represents a hydrocarbon radical selected from the group consisting of tert-butyl, 2,4,4-trimethyl-2-pentyl, 2,4-dimethyl-2-heptyl, 1-phenylethyl and 2-phenyl-2-propyl. claim 3

According to a highly preferred embodiment the invention relates to a composition, which comprises an additive mixture that essentially consists of a) At least one compound (I'), wherein one of $R_1$ and $R_2$ independently of one another represent hydrogen or a hydrocarbon radical selected from the group consisting of 2,4-dimethyl-2-heptyl and 2-phenyl-2-propyl and the other one represents a hydrocarbon radical selected from the group consisting of 2,4-dimethyl-2-heptyl and 2-phenyl-2-propyl; and b) At least one compound (II'), wherein $R_1$ and $R_2$ independently of one another represent hydrogen or a hydrocarbon radical selected from the group consisting of tert-butyl, 2,4,4-trimethyl-2-pent-2-yl, 2,4-dimethyl-2-heptyl and 2-phenyl-2-propyl; and $R_3$ represents a hydrocarbon radical selected from the group consisting of tert-butyl, 2,4,4-trimethyl-2-pent-2-yl, 2,4-dimethyl-2-heptyl and 2-phenyl-2-propyl. claim 4

According to a particularly relevant embodiment the invention relates to a composition, which comprises an additive mixture that essentially consists of a) At least one compound (I'), wherein one of $R_1$ and $R_2$ independently of one another represents hydrogen or a hydrocarbon radical selected from the group consisting of 2,4-dimethyl-2-heptyl and 2-phenyl-2-propyl and the other one represents a hydrocarbon radical selected from the group consisting of 2,4-dimethyl-2-heptyl and 2-phenyl-2-propyl; and b) At least one compound (II'), wherein $R_1$ and $R_2$ independently of one another represent hydrogen or a hydrocarbon radical selected from the group consisting of 2,4-dimethyl-2-heptyl and 2-phenyl-2-propyl; and $R_3$ represents a hydrocarbon radical selected from the group consisting of 2,4-dimethyl-2-heptyl and 2-phenyl-2-propyl. claim 5

A further embodiment of the invention relates to the additive mixture that essentially consists of a) At least one compound (I), wherein one of $R_1$ and $R_2$ independently of one another represents hydrogen or a hydrocarbon radical selected from the group consisting of branched nonyl, 1-phenylethyl and 2-phenyl-2-propyl and the other one represents a hydrocarbon radical selected from the group consisting of branched nonyl, 1-phenylethyl and 2-phenyl-2-propyl; and b) At least one compound (II), wherein $R_1$ and $R_2$ independently of one another represent hydrogen or a hydrocarbon radical selected from the group consisting of tert-butyl, branched octyl, branched nonyl, 1-phenylethyl and 2-phenyl-2-propyl; and $R_3$ represents a hydrocarbon radical selected from the group consisting of tert-butyl, branched octyl, branched nonyl, 1-phenylethyl and 2-phenyl-2-propyl. claim 9

The compositions according to the present invention have an outstanding anti-oxidative action, which can be demonstrated by established test methods, such as TAN (Total acid number, ASTM D 664 by potentiometric titration procedure), Viscosity (ASTM D 445, Kinematic viscosity procedure, sludge formation (determined by filtering the tested oil through pre-dried and pre-weighed filter paper) or Copper corrosion (weight loss of a copper coupon).

The terms and definitions used in the context of the description of the present invention preferably have the following meanings:

Component A

In a compound (I) one of $R_1$ and $R_2$ independently of one another represents hydrogen or a hydrocarbon radical selected from the group consisting of branched nonyl, 1-phenylethyl and 2-phenyl-2-propyl and the other one represents a hydrocarbon radical selected from the group consisting of branched nonyl, 1-phenylethyl and 2-phenyl-2-propyl.

In a compound (II) $R_1$ and $R_2$ independently of one another represent hydrogen or a hydrocarbon radical selected from the group consisting of tert-butyl, branched octyl, branched nonyl, 1-phenylethyl and 2-phenyl-2-propyl; and $R_3$ represents a hydrocarbon radical selected from the group consisting of tert-butyl, branched octyl, branched nonyl, 1-phenylethyl and 2-phenyl-2-propyl.

The term branched nonyl applies to any substituent obtained by alkylating the phenyl or naphthyl moiety with tripropylene:

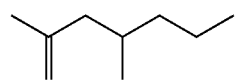

and corresponds to the partial formulae of the following preferred substituents (carbon-carbon bonds to the phenyl or naphthyl moiety are represented by dotted lines): 2,4-Dimethyl-2-heptyl:

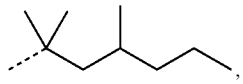

2,4,5-trimethyl-2-hexyl:

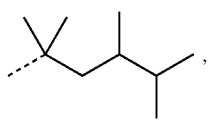

2,3,3-trimethyl-2-hexyl:

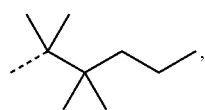

2,3,5-trimethyl-2-hexyl:

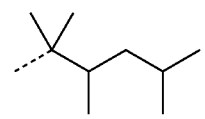

or 2,6-dimethyl-2-heptyl:

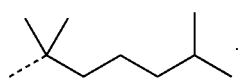

1-Phenylethyl is obtained by alkylating the phenyl or naphthyl moiety with styrene and corresponds to the following partial formula:

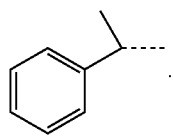

2-Phenyl-2-propyl is obtained by alkylating the phenyl or naphthyl moiety with α-methylstyrene and corresponds to the following partial formula:

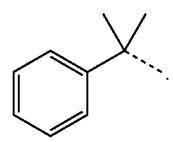

The term branched octyl applies to any substituent obtained by alkylating the phenyl or naphthyl moiety with diisobutylene, which is a mixture of:
2,4,4-Trimethylpent-1-ene:

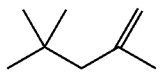

or 2,4,4-trimethylpent-2-ene:

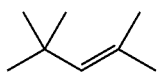

and corresponds to the partial formulae of the following preferred substituents:
2,2,4-Trimethylpentyl:

or 2,4,4-trimethyl-2-pentyl:

Compounds of the formula (I), wherein $R_1$ and $R_2$ are as defined above are known or can be obtained by methods known per se, e.g. a process, in which N-α-naphthyl-N-phenylamine are alkylated with tripropylene, styrene or α-methylstyrene in the presence of suitable acid catalysts, such as proton donors (so-called BrØnsted acids), electron acceptor compounds (so-called Lewis acids), cation exchanger resins, aluminosilicates or naturally occurring or modified layered (=sheet) silicates.

Some compounds of the formula (I) are commercially available, such as the products available under the trade mark Irganox®L 06 (Ciba Specialty Chemicals Holding Inc.).

Compounds of the formula (II), wherein $R_1$, $R_2$ and $R_3$ are as defined above are known or can be obtained by methods known per se, e.g. a process as specified in U.S. Pat. No. 6,315,925. According to that process diphenylamine is alkylated with nonene or a mixture of isomeric nonenes in the presence of an acid clay.

U.S. Pat. No. 2,943,112 discloses the reaction of diphenylamine with tripropylene in the presence of mineral acids and large quantities of acid days as catalysts and subsequent reaction with additional alkenes, e.g. styrene or α-methylstyrene.

EP-A-149 422 discloses the reaction of diphenylamine with diisobutylene in the presence of acid catalysts.

Some compounds of the formula (I) are commercially available, such as the products available under the trade mark Irganox®L 57 or 67 (Ciba Specialty Chemicals Holding Inc.).

Component B

A composition of matter susceptible to oxidative, thermal or light induced degradation is a natural, semi-synthetic or synthetic polymer or a functional fluid. claim 6

According to a particularly preferred embodiment the functional fluid is a lubricant, machining fluid or a hydraulic fluid. claim 7

A further embodiment of the invention relates to composition, which additionally contains conventional additives suitable for protecting a composition of matter susceptible to oxidative, thermal and light induced degradation. claim 8

A further embodiment of the invention relates to the process for stabilizing a composition of matter susceptible to oxidative, thermal and/or light induced degradation, which comprises adding or applying to the composition of matter the composition defined above as a stabiliser. claim 12

Suitable synthetic polymers are obtained by conventional methods of polymerisation from monomers or oligomers selected from the group consisting of monomeric or oligomeric alkenes, styrenes, conjugated dienes, acrolein, vinyl acetate, vinyl pyrrolidone, vinyl imidazole, maleic acid anhydride, acrylic acid, $C_1$-$C_4$alkyl acrylic acid or amides, nitriles, anhydrides and salts of acrylic acid and $C_1$-$C_4$alkyl acrylic acid, acrylic acid $C_1$-$C_{24}$alkyl esters, $C_1$-$C_4$alkyl acrylic acid $C_1$-$C_{24}$alkyl esters, vinyl halides and vinylidene halides.

According to a preferred embodiment polyolefins are preferred as synthetic polymers. Suitable polyolefins are polymers of monoolefins and diolefins, for example polypropylene, polyisobutylene, polybut-1-one, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

These polyolefins are obtainable by known methods, such as radical polymerisation (normally under high pressure and at elevated temperature) or catalytic polymerisation using a catalyst that normally contains one or more than one metal of groups IVb, Vb, VIb or VIII of the Periodic Table. These catalyst systems are usually termed Phillips, Standard Oil Indiana, Ziegler (-Natta), TNZ (DuPont), metallocene or single site catalysts (SSC).

Other polyolefins present in the composition defined above are

Mixtures of the polymers mentioned above, for example mixtures of polypropylene with polyisobutylene, polypropylene with polyethylene, for example PP/HDPE, PP/LDPE, and mixtures of different types of polyethylene, for example LDPE/HDPE;

Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic copolymers and their salts (ionomers) as well as terpolymers of ethylene with propylene and a diene, such as hexadiene, dicyclopentadiene or ethylidene-norbornene; and mixtures of such copolymers with one another and with polymers mentioned above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The composition of the invention can comprise additives suitable for polymers, which additives are preferably used as formulating auxiliaries to improve the chemical and physical properties of the polymers containing these additives. The auxiliaries can be present in high proportions, for example, in amounts of up to 70% by weight, preferably from 1 to 70% by weight, more preferably from 5 to 60% by weight, with particular preference from 10 to 50% by weight and with especial preference from 10 to 40% by weight, based on the weight of the composition. Such auxiliaries have been disclosed in large numbers and are set out by way of example in the following list of auxiliaries: antioxidants selected from the group consisting of alkylated monophenols, alkylthiomethylphenols, hydroquinones and alkylated hydroquinones, tocopherols, hydroxylated thiodiphenyl ethers, alkylidene-bis-phenols, O-, N- and S-benzyl compounds, hydroxybenzylated malonates, aromatic hydroxybenzyl compounds, triazine compounds, benzylphosphonates, acylaminophenols, esters and amides of β-(3,5-d-it-butyl-4-hydroxyphenyl)propionic acid, β-(3,5-di-t-butyl-4-hydroxy-3-methylphenyl)propionic acid, or β-(3,5-dicyclohexyl-t-hydroxyphenyl)propionic acid, ascorbic add, aminic antioxidants, light stabilisers, phosphates, phosphines, phosphonites, hydroxylamines, nitrones, thiosynergists, peroxide scavengers, polyamide stabilisers, basic co-stabilisers, nucleating agents, fillers and reinforcing agents, plasticisers, lubricants, emulsifiers, pigments, rheological additives, levelling assistants, optical brighteners, flame proofing agents, antistatic agents, blowing agents, benzofuranones and indolinones.

The invention relates also to the use of the composition, preferably in the mentioned concentration, as additives in motor oils, turbine oils, gear oils, hydraulic fluids, metalworking fluids or lubricating greases.

Another embodiment of the invention relates to a process for stabilising the composition of matter subjected to oxidative, thermal and/or light induced degradation, which comprises adding or applying to the composition of matter the composition defined above as a stabiliser.

The invention likewise relates to a process for protection against corrosion or oxidative degradation of metals, which are in contact with functional fluids, wherein the alkylation reaction products (I) and (II) defined further above are added to the functional fluid.

The term functional fluid includes aqueous, partially aqueous and non-aqueous fluids, particular base oils of lubricating viscosity, which can be used for the preparation of greases, metal working fluids, gear fluids and hydraulic fluids.

The compositions according to the invention preferably comprise 0.01 to 5.0% by weight, in particular 0.02 to 1.0% by weight, of the mixture comprising the alkylated products (I) and (II), based on the weight of the functional fluid.

Examples of aqueous functional fluids are industrial cooling water, filling compositions of a water conditioning plant, steam generation systems, sea water evaporation systems, sugar evaporation systems, irrigation systems, hydrostatic boilers and heating systems or cooling systems having a closed circulation.

Examples of suitable partially aqueous functional fluids are hydraulic fluids based on aqueous polyglycol/polyglycol ether mixtures or glycol systems, water-in-oil or oil-in-water systems and engine cooling systems based on aqueous glycol.

Examples of non-aqueous functional fluids are fuels, e.g. hydrocarbon mixtures comprising mineral oil fractions which are liquid at room temperature and are suitable for use in internal combustion engines, e.g. internal combustion engines with external (petrol engines) or Internal ignition (diesel engines), e.g. petrol having different octane contents (regular grade or premium grade petrol) or diesel fuel, and lubricants, hydraulic fluid, metal working fluid, engine coolants, transformer oil and switchgear oil.

Non-aqueous functional fluids are preferred, in particular base oils of lubricating viscosity, which can be used for the preparation of greases, metal working fluids, gear fluids and hydraulic fluids.

Suitable greases, metal working fluids, gear fluids and hydraulic fluids are based, for example, on mineral or synthetic oils or mixtures thereof. The lubricants are familiar to a person skilled in the art and are described in the relevant literature, such as, for example, in *Chemistry and Technology of Lubricants*; Mortier, R. M. and Orszulik, S. T. (Editors); 1992 Blackie and Son Ltd. for GB, VCH-Publishers N.Y. for U.S., ISBN 0-216-92921-0, cf. pages 208 et seq. and 269 et seq.; in Kirk-Othmer *Encyclopedia of Chemical Technology, Fourth Edition* 1969, J. Wiley & Sons, New York, Vol. 13, page 533 et seq. (Hydraulic Fluids); *Performance Testing of Hydraulic Fluids*; R. Tourret and E. P. Wright, Hyden & Son Ltd. GB, on behalf of The Institute of Petroleum London, ISBN 0 85501 317 6; *Ullmann's Encyclopedia of Ind. Chem., Fifth Completely Revised Edition*, Verlag Chemie, DE-Weinheim, VCH-Publishers for U.S., Vol. A 15, page 423 et seq. (Lubricants), Vol. A 13, page 165 et seq. (Hydraulic Fluids).

A particularly preferred embodiment of the invention relates to a lubricant composition comprising A) The mixture of compounds (I) and (II) as defined above; and B) A base oil of lubricating viscosity.

The lubricants are in particular oils and greases, for example based on mineral oil or vegetable and animal oils, fats, tallow and wax or mixtures thereof. Vegetable and animal oils, fats, tallow and wax are, for example, palm kernel oil, palm oil, olive oil, colza oil, rapeseed oil, linseed oil, soy bean oil, cotton wool oil, sunflower oil, coconut oil, maize oil, castor oil, walnut oil and mixtures thereof, fish oils, and chemically modified, e.g. epoxidised or sulphoxidised, forms or forms prepared by genetic engineering, for example soy bean oil prepared by genetic engineering.

Examples of synthetic lubricants include lubricants based on aliphatic or aromatic carboxylic esters, polymeric esters, polyalkylene oxides, phosphoric acid esters, poly-α-olefins, silicones, alkylated benzene, alkylated naphthalenes or the diester of a di basic acid with a monohydric alcohol, e.g. dioctyl sebacate or dinonyl adipate, of a triester of trimethylolpropane with a monobasic acid or with a mixture of such acids, e.g. trimethylolpropane tripelargonate, trimethylolpropane tricaprylate or mixtures thereof, of a tetra ester of pentaerythritol with a monobasic acid or with a mixture of such acids, e.g. pentaerythrityl tetracaprylate, or of a complex ester of monobasic and dibasic acids with polyhydric alcohols, e.g. a complex ester of trimethylolpropane with caprylic and sebacic acid or of a mixture thereof. Particularly suitable in addition to mineral oils are, for example, poly-α-olefins, ester-based lubricants, phosphates, glycols, polyglycols and polyalkylene glycols and mixtures thereof with water.

Said lubricants or mixtures thereof can also be mixed with an organic or inorganic thickener (base fat). Metal working fluids and hydraulic fluids can be prepared on the basis of the same substances as described above for the lubricants. These are frequently also emulsions of such substances in water or other fluids.

The invention relates also to a method of improving the performance properties of lubricants, which comprises adding to the lubricant at least one product as defined above. The lubricant compositions, e.g. greases, gear fluids, metal working fluids and hydraulic fluids, may additionally contain further additives, which are added to improve further their performance properties. These include: other antioxidants, metal deactivators, rust inhibitors, viscosity index improvers, pourpoint depressants, dispersants, detergents, extreme pressure additives and antiwear additives. Such additives are added in customary amounts, each in the range from 0.01 to 10.0% by weight. Examples of further additives are listed below:

1. Phenolic antioxidants 1.1. Alkylated monophenols: 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-iso-butylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear nonylphenols or nonylphenols which are branched in the side chain, e.g. 2,6-dinonyl-4-methylphenol, 2,4-dimethyl-6-(1'-methyl-undec-1'-yl)phenol, 2,4-dimethyl-6-(1'-methylheptadec-1'-yl)phenol, 2,4-dimethyl-6-(1-methyltridec-1'-yl)phenol and mixtures thereof 1.2. Alkylthiomethylphenols: 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol 1.3. Hydroquinones and alkylated hydroquinones: 2,6-di-tert-butyl-4-methoxyphenol, 2,5-di-tert-butyl-hydroquinone, 2,5-di-tert-amylhydroquinone, 2,6-diphenyl-4-octadecyl-oxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenylstearate, bis(3,5-di-tert-butyl-4-hydroxyphenyl)adipate 1.4. Tocopherols: α-, β-, γ- or δ-tocopherols and mixtures thereof (vitamin E)

1.5. Hydroxylated thiodiphenyl ethers: 2,2'-thiobis(6-tert-butyl-4-methylphenol), 2,2'-thiobis(4-octylphenol), 4,4'-thiobis(6-tert-butyl-4-methylphenol), 4,4'-thiobis-(6-tert-butyl-2-methylphenol), 4,4'-thiobis(3,6-di-sec-amylphenol), 4,4'-bis(2,6-dimethyl-4-hydroxyphenyl)disulphide 1.6. Alkylidene bisphenols: 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenyl], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis-(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4- hydroxyphenyl)propane, 2,2-bis(5-tert-butyl-4-hydroxy-2-methylphenyl)-4-n-dodecylmercaptobutane, 1,1,5,5-tetrakis(5-tert-butyl-4-hydroxy-2-methylphenyl)pentane 1.7. O-, N- and S-benzyl compounds: 3,5,3',5'-tetra-tert-butyl-4,4'-dihydroxydibenzyl ether, octadecyl 4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulphide, isooctyl 3,5-di-tert-butyl-4-hydroxybenzylmercaptoacetate 1.8. Hydroxybenzylated malonates: dioctadecyl 2,2-bis(3,5-di-tert-butyl-2-hydroxybenzyl)-malonate, dioctadecyl 2-(3-tert-butyl-4-hydroxy-5-methylbenzyl)malonate, didodecyl mercaptoethyl-2,2-bis(3,5-di-tert-butyl-4-hydroxybenzyl)malonate, di-[4-(1,1,3,3-tetramethylbutyl)phenyl]-2,2-bis(3,5-di-tert-butyl-4-hydroxybenzyl)malonate 1.9. Hydroxybenzyl aromatics: 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol 1.10. Triazine compounds: 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)iso-cyanurate, 2,4,6-tris(3,5-di-tert-butyl-4-hydroxyphenylethyl-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate 1.11. Acylaminophenols: 4-hydroxylauranilide, 4-hydroxystearanilide, octyl N-(3,5-di-tert-butyl-4-hydroxyphenyl)carbamate 1.12. Esters of beta-(3,5-di-tert-butyl-4-hydroxyphenyl)propionic acid with monohydric or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane 1.13. Esters of beta-(5-tert-butyl-4-hydroxy-3-methylphenyl)propionic acid (with monohydric or polyhydric alcohols), e.g. with methanol, ethanol, n-octanol, isooctanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane 1.14. Esters of beta-(3,5-dicyclohexyl-4-hydroxyphenyl)propionic acid with monohydric or polyhydric alcohols, e.g. the alcohols stated under 1.13.

1.15. Ester of 3,5-di-tert-butyl-4-hydroxyphenylacetic acid with monohydric or polyhydric alcohols, e.g. the alcohols stated under 1.13.

1.16. Amides of beta-(3,5-di-tert-butyl-4-hydroxyphenyl)propionic acid, e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine 1.17. Ascorbic acid (vitamin C)

1.18. Amine antioxidants: N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methyl-heptyl)-p-phenylenediamine, N,N'-dicyclohexyl-p-phenylenediamine, N,N'-diphenyl-p-phenylenediamine, N,N'-di-(naphth-2-yl)-p-phenylenediamine, N-isopropyl-N'-phenyl-p-phenylenediamine, N-(1,3-dimethyl-butyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulphonamido)diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butylaminophenol, 4-nonanoylamino-phenol, 4-dodecanoylaminophenol, 4-octadecanoylaminophenol, di-4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-di-[(2-methylphenyl)-amino]ethane, 1,2-di-(phenylamino)propane, (o-tolyl)biguanide, di-[4-(1',3'-dimethylbutyl)phenyl]amine, tert-octylated N-phenyl-1-naphthylamine, mixture of mono- and dialkylated tert-butyl/tert-octyldiphenylamines, mixture of mono- and dialkylated non-yldiphenylamines, mixture of mono- and dialkylated dodecyldiphenylamines, mixture of mono- and dialkylated isopropyl/isohexyldiphenylamines, mixtures of mono- and dialkylated tert-butyldiphenylamines, 2,3-dihydro-3,3-dimethyl-4H-1,4-benzothiazine, phenothiazine, mixture of mono- and dialkylated tert-butyl tert-octylphenothiazines, mixture of mono- and dialkylated tert-octyl or nonylphenothiazines, N-allylphenothiazine, N,N,N',N'-tetraphenyl-1,4-diaminobut-2-ene, N,N-bis(2,2,6,6-tetramethylpiperidin-4-yl)-hexamethylenediamine, bis-(2,2,6,6-tetramethylpiperidin-4-yl)sebacate, 2,2,6,6-tetramethylpiperidinone, 2,2,6,6-tetramethylpiperidin-4-ol 2. Further antioxidants: aliphatic or aromatic phosphites, esters of thiodipropionic acid or thiodiacetic acid or salts of dithiocarbamic or dithiophosphoric acid, 2,2,12,12-tetramethyl-5,9-dihydroxy-3,7,11-trithiatridecane and 2,2,15,15-tetramethyl-5,12-dihydroxy-3,7,10,14-tetrathiahexadecane 3. Further metal deactivators, e.g. for copper:

3.1. Benzotriazoles and derivatives thereof: 2-mercaptobenzotriazole, 2,5-dimercaptobenzotriazole, 4- or 5-alkylbenzotriazoles (e.g. tolutriazole) and derivatives thereof, 4,5,6,7-tetrahydrobenzotriazole, 5,5'-methylenebisbenzotriazole; Mannich bases of benzotriazole or tolutriazole, such as 1-[di(2-ethylhexylaminomethyl)]tolutriazole and 1-[di(2-ethylhexylaminomethyl)]benzotriazole; alkoxyalkylbenzotriazoles, such as 1-(nonyloxymethyl)benzotriazole, 1-(1-butoxyethyl)benzotriazole and 1-(1-cyclohexyl-oxybutyl)tolutriazole 3.2. 1,2,4-Triazoles and derivatives thereof: 3-alkyl (or aryl)-1,2,4-triazoles, Mannich bases of 1,2,4-triazoles, such as 1-[di(2-ethylhexyl)aminomethyl]-1,2,4-triazole; alkoxyalkyl-1,2,4-triazoles, such as 1-(1-butoxyethyl)-1,2,4-triazole; acylated 3-amino-1,2,4-triazoles 3.3. Imidazole derivatives: 4,4'-methylenebis(2-undecyl-5-methylimidazole), bis[(N-methyl)imidazol-2-yl]carbinol octyl ether
3.4. Sulphur-containing heterocyclic compounds: 2-mercaptobenzothiazole, 2,5-dimercapto-1,3,4-thiadiazole, 2,5-dimercaptobenzothiadiazole and derivatives thereof; 3,5-bis[di-(2-ethylhexyl)aminomethyl]-1,3,4-thiadiazolin-2-one
3.5. Amino compounds: salicylidenepropylenediamine, salicylaminoguanidine and salts thereof
4. Corrosion inhibitors
4.1. Organic acids, their esters, metal salts, amine salts and anhydrides: e.g. alkyl- and alkyenylsuccinic acids and partial esters thereof with alcohols, diols or hydroxycarboxylic acids, partial amides of alkyl- and alkenylsuccinic acids, 4-nonylphenoxyacetic acid, alkoxy- and alkoxyethoxycarboxylic acids, such as dodecyloxyacetic acid, dodecyloxy(ethoxy)acetic acid and amine salts thereof, and furthermore N-oleoylsarcosine, sorbitan monooleate, lead naphthenate, alkenylsuccinic anhydrides, e.g. dodecenylsuccinic anhydride, 2-(2-carboxyethyl)-1-dodecyl-3-methylglycerol and salts thereof, in particular sodium salts and triethanolamine salts
4.2. Nitrogen-containing compounds:
4.2.1. Tertiary aliphatic and cycloaliphatic amines and amine salts of organic and inorganic acids, e.g. oil-soluble alkylammonium carboxylates, and furthermore 1-[N,N-bis-(2-hydroxyethyl)amino]-3-(4-nonylphenoxy)propan-2-ol
4.2.2. Heterocyclic compounds, e.g. substituted imidazolines and oxazolines, e.g. 2-hepta-decenyl-1-(2-hydroxyethyl) imidazoline
5. Sulphur-containing compounds: barium dinonylnaphthalenesulphonates, calcium petroleum sulphonates, alkylthio-substituted aliphatic carboxylic acids, esters of aliphatic 2-sulphocarboxylic acids and salts thereof
6. Viscosity index improvers: polyacrylates, polymethacrylates, vinylpyrrolidone/methacrylate copolymers, polyvinylpyrrolidiones, polybutenes, olefin copolymers, styrene/acrylate copolymers, polyethers
7. Pour point depressants: poly(meth)acrylates, ethylene-vinyl acetate copolymers, alkyl polystyrenes, fumarate copolymers, alkylated naphthalene derivatives
8. Dispersants/Surfactants: polybutenylsuccinamides or polybutenylsuccinimides, polybutenylphosphonic acid derivatives, basic magnesium, calcium and barium sulphonates and phenolates
9. Extreme pressure and antiwear additives: sulphur- and halogen-containing compounds, e.g. chlorinated paraffins, sulphonated olefins or vegetable oils (soy bean oil, rapeseed oil), alkyl or aryl di- or trisulphides, benzotriazoles or derivatives thereof, such as bis(2-ethylhexyl)aminomethyl tolutriazoles, dithiocarbamates, such as methylenebisdibutyl dithiocarbamate, derivatives of 2-mercaptobenzothiazole, such as 1-[N,N-bis(2-ethylhexyl)-aminomethyl]-2-mercapto-1H-1,3-benzothiazole, derivatives of 2,5-dimercapto-1,3,4-thiadiazole, such as 2,5-bis(tert-nonyldithio)-1,3,4-thiadiazole
10. Substances for reducing the coefficient of friction: lard oil, oleic acid, tallow, rapeseed oil, and sulphurised fats, amines. Further examples are stated in EP-A-0 565 487
11. Special additives for use In water/oil metal processing and hydraulic fluids:
11.1. Emulsifiers: petroleum sulphonates, amines, such as polyoxyethylated fatty amines, non-ionic surface-active substances
11.2. Buffers: alkanolamines
11.3. Biocides: triazines, thiazolinones, trisnitromethane, morpholine, sodium pyridinethiol
11.4. Processing speed improvers: calcium sulphonates and barium sulphonates.

Said components can be admixed to the lubricant composition in a manner known per se. It is also possible to prepare a concentrate or a so-called additive package, which can be diluted to the concentrations of use for the corresponding lubricant according to the technical requirements.

According to an additional embodiment the invention also relates to the product obtainable by alkylating a mixture of N-n-naphthyl-N-phenylamine (PANA) and diphenylamine with nonene or a mixture of isomeric nonenes in the presence of α-methylstyrene and an acidic catalyst. claim 10

According to a preferred embodiment the invention relates to the product obtainable by alkylating N-α-naphthyl-N-phenyl amine (PANA) with nonene or a mixture of isomeric nonenes in the presence of α-methylstyrene and an acidic catalyst. claim 11

According to an additional embodiment the present invention relates to a process for preparing the composition defined above, which comprises alkylating N-α-naphthyl-N-phenylamine (PANA) or a mixture of PANA and diphenylamine with nonene or a mixture of isomeric nonenes in the presence of styrene or α-methylstyrene and an acidic catalyst and adding to the reaction mixture a compound (II) wherein $R_1$ and $R_2$ independently of one another represent hydrogen or a hydrocarbon radical selected from the group consisting of tert-butyl and branched octyl and $R_3$ represents branched octyl. claim 13

Specific embodiments of that process are illustrated by the following reaction scheme:

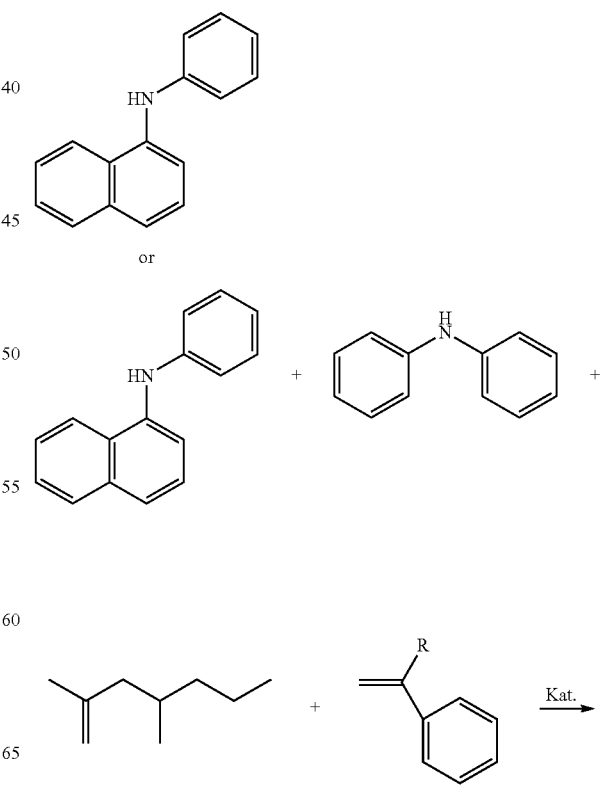

-continued

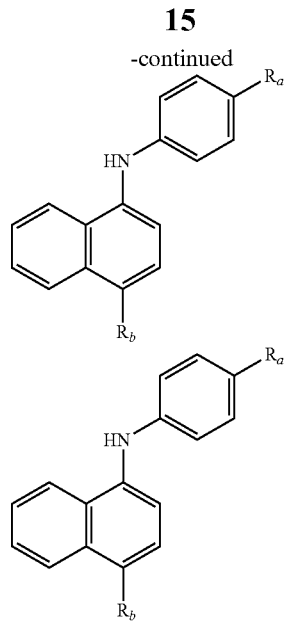

wherein

R represents hydrogen (styrene) or methyl (α-methylstyrene);

One of $R_a$ and $R_b$ represents hydrogen or a substituent selected from the group consisting of branched nonyl, 1-phenylethyl and 2-phenyl-2-propyl and the other one represents a substituent selected from the group consisting of branched nonyl, 1-phenylethyl and 2-phenyl-2-propyl; and One of $R_c$ and $R_d$ represents hydrogen or a substituent selected from the group consisting of branched nonyl, 1-phenylethyl and 2-phenyl-2-propyl and the other one represents a substituent selected from the group consisting of branched nonyl, 1-phenylethyl and 2-phenyl-2-propyl.

By admixing to these compositions the compound (II) the following compositions are obtained:

wherein $R_a$, $R_b$, $R_c$ or $R_d$ are as defined above, and

One of $R_c'$ and $R_d'$ represents hydrogen or a substituent selected from the group consisting of tert-butyl and branched octyl the other one represents branched octyl.

According to a preferred embodiment the present invention relates to a process for preparing the composition defined above, which comprises alkylating N-α-naphthyl-N-phenylamine (PANA) with nonene or a mixture of isomeric nonenes in the presence of α-methylstyrene and an acidic catalyst and adding to the reaction mixture a compound (II) or a mixture of the compound (II), wherein $R_1$ and $R_2$ independently of one another represent hydrogen or a hydrocarbon radical selected from the group consisting of tert-butyl, branched octyl and branched nonyl and $R_3$ represents a hydrocarbon radical selected from the group consisting of tert-butyl, branched octyl and branched nonyl. claim 14

Specific embodiments of that process are illustrated by the following reaction scheme:

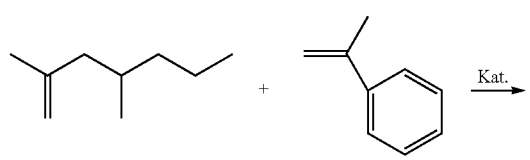

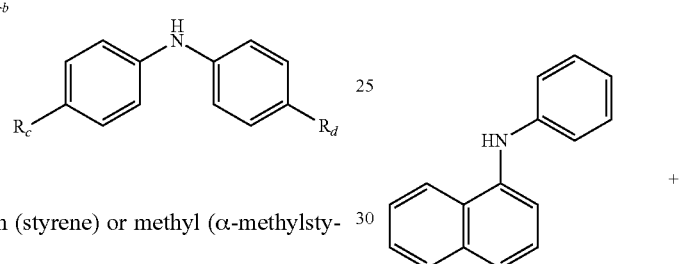

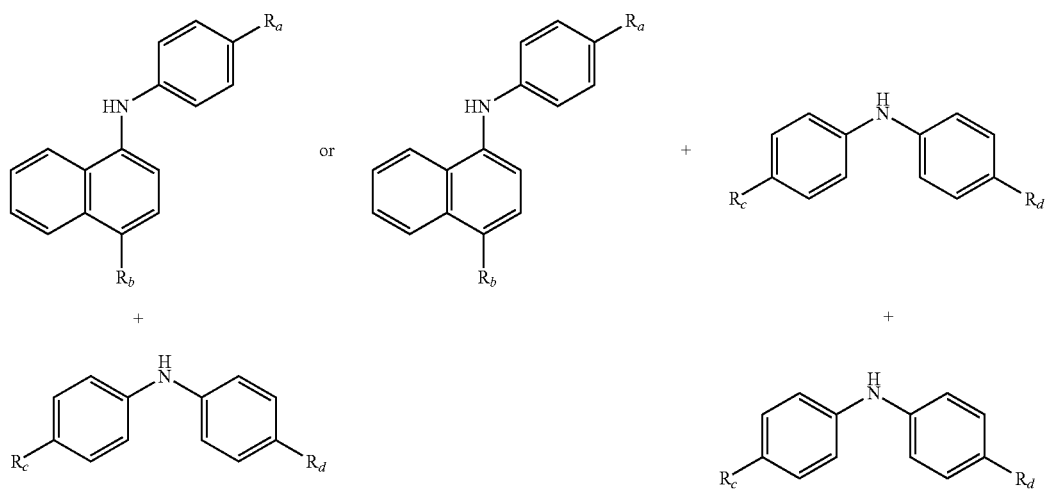

-continued

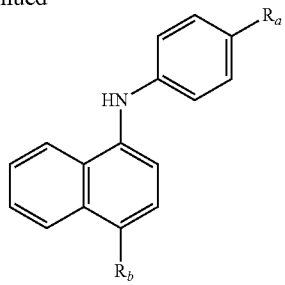

wherein

One of $R_a$ and $R_b$ represents hydrogen or a substituent selected from the group consisting of branched nonyl and 2-phenyl-2-propyl and the other one represents a substituent selected from the group consisting of branched nonyl and 2-phenyl-2-propyl.

By admixing to this composition the compound (II) the following compositions are obtained:

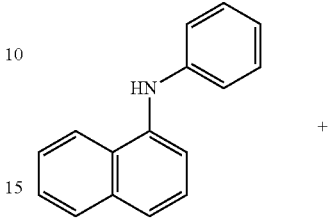

+

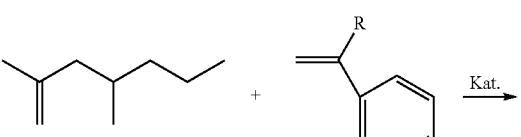

wherein $R_a$ and $R_b$ are as defined above; and

One of $R_c$ and $R_d$ represents hydrogen or a substituent selected from the group consisting of tert-butyl, branched octyl and branched nonyl and the other one represents a substituent selected from the group consisting of branched octyl and branched nonyl.

According to a particularly preferred embodiment the invention relates to a process for the preparation of a mixture comprising at least one compound (I), wherein one of $R_1$ and $R_2$ independently of one another represents hydrogen or a hydrocarbon radical selected from the group consisting of branched nonyl, 1-phenylethyl and 2-phenyl-2-propyl and the other one represents a hydrocarbon radical selected from the group consisting of branched nonyl, 1-phenylethyl and 2-phenyl-2-propyl, which comprises alkylating N-α-naphthyl-N-phenylamine (PANA) with nonene or a mixture of isomeric nonenes in the presence of styrene or α-methylstyrene and an acidic catalyst. claim 15

Specific embodiments of that process are illustrated by the following reaction scheme:

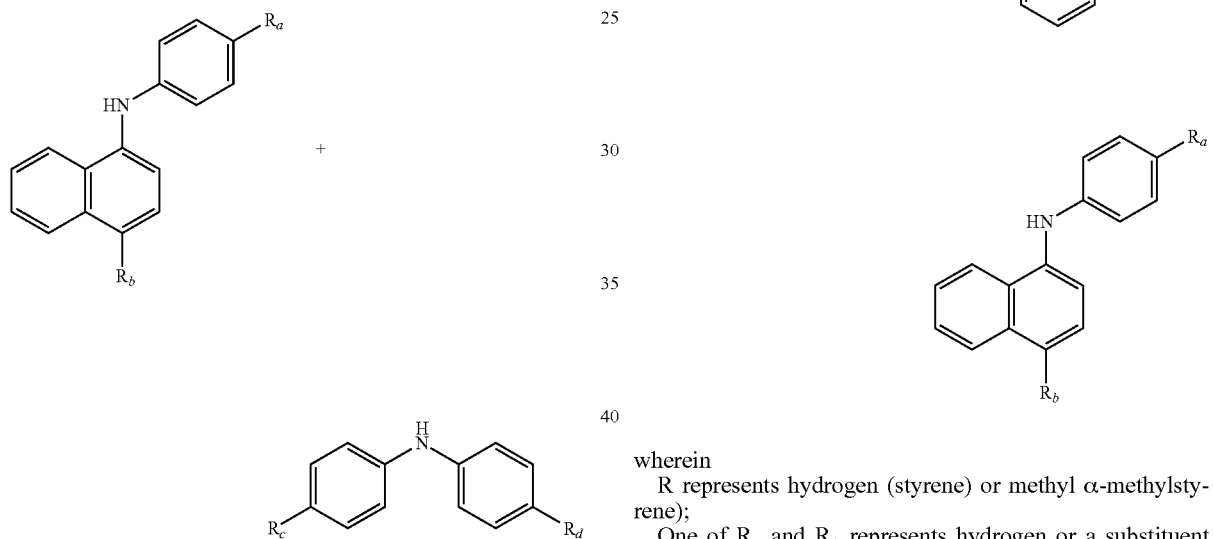

wherein

R represents hydrogen (styrene) or methyl α-methylstyrene);

One of $R_a$ and $R_b$ represents hydrogen or a substituent selected from the group consisting of branched nonyl, 1-phenylethyl and 2-phenyl-2-propyl and the other one represents a substituent selected from the group consisting of branched nonyl, 1-phenylethyl and 2-phenyl-2-propyl.

According to a highly preferred embodiment the present invention relates to a process for the preparation of a mixture comprising at least one compound (I), wherein one of $R_1$ and $R_2$ independently of one another represents hydrogen or a hydrocarbon radical selected from the group consisting of branched nonyl, 1-phenylethyl and 2-phenyl-2-propyl and the other one represents a hydrocarbon radical selected from the group consisting of branched nonyl, 1-phenylethyl and 2-phenyl-2-propyl; and at least one compound (II), wherein $R_1$ and $R_2$ independently of one another represent hydrogen or a hydrocarbon radical selected from the group consisting of branched nonyl, 1-phenylethyl and 2-phenyl-2-propyl; and $R_3$ represents a hydrocarbon radical selected from the group consisting of branched nonyl, 1-phenylethyl and 2-phenyl-2-propyl, which comprises alkylating N-α-naphthyl-N-phenylamine (PANA) and diphenylamine with nonene or a mixture of isomeric nonenes in the presence of styrene or α-methylstyrene and an acidic catalyst. claim 16

Specific embodiments of that process are illustrated by the following reaction scheme:

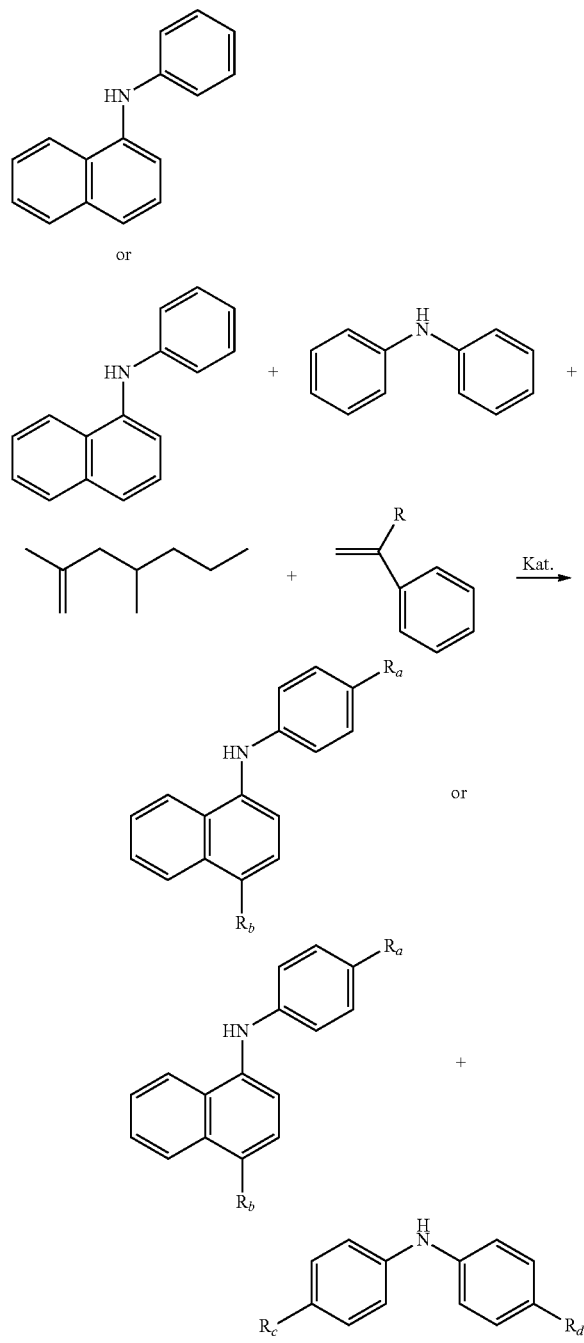

wherein

R represents hydrogen (styrene) or methyl (α-methylstyrene);

One of $R_a$ and $R_b$ represents hydrogen or a substituent selected from the group consisting of branched nonyl, 1-phenylethyl and 2-phenyl-2-propyl and the other one represents a substituent selected from the group consisting of branched nonyl, 1-phenylethyl and 2-phenyl-2-propyl; and One of $R_c$ and $R_d$ represents hydrogen or a substituent selected from the group consisting of branched nonyl, 1-phenylethyl and 2-phenyl-2-propyl and the other one represents a substituent selected from the group consisting of branched nonyl, 1-phenylethyl and 2-phenyl-2-propyl.

According to a further embodiment the present invention relates to a process for the preparation of a mixture comprising at least one compound (I), wherein one of $R_1$ and $R_2$ independently of one another represents hydrogen or a hydrocarbon radical selected from the group consisting of branched nonyl and 2-phenyl-2-propyl and the other one represents a hydrocarbon radical selected from the group consisting of branched nonyl and 2-phenyl-2-propyl, which comprises alkylating N-α-naphthyl-N-phenylamine (PANA) with nonene or a mixture of isomeric nonenes in the presence of α-methylstyrene and an acidic catalyst. claim 17

Specific embodiments of that process are illustrated by the following reaction scheme:

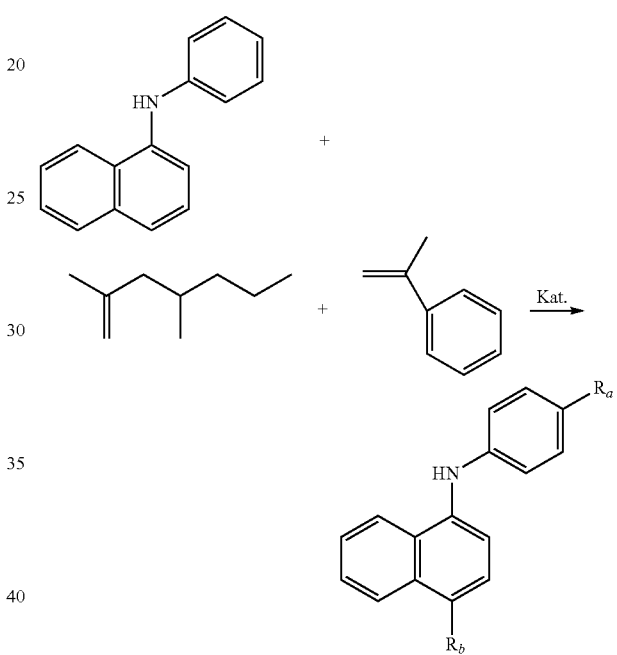

wherein

One of $R_a$ and $R_b$ represents hydrogen or a substituent selected from the group consisting of branched nonyl and 2-phenyl-2-propyl and the other one represents a substituent selected from the group consisting of branched nonyl and 2-phenyl-2-propyl.

According to a particularly relevant embodiment the present invention relates to a process for the preparation of a mixture comprising at least one compound (I), wherein one of $R_1$ and $R_2$ Independently of one another represents hydrogen or a hydrocarbon radical selected from the group consisting of branched nonyl and 2-phenyl-2-propyl and the other one represents a hydrocarbon radical selected from the group consisting of branched nonyl and 2-phenyl-2-propyl; and at least one compound (II), wherein $R_1$ and $R_2$ independently of one another represent hydrogen or a hydrocarbon radical selected from the group consisting of branched nonyl and 2-phenyl-2-propyl; and $R_3$ represents a hydrocarbon radical selected from the group consisting of branched nonyl and 2-phenyl-2-propyl, which comprises alkylating N-α-naphthyl-N-phenylamine (PANA) or diphenylamine with nonene or a mixture of isomeric nonenes in the presence of x-methylstyrene and an acidic catalyst. claim 18

Specific embodiments of that process are illustrated by the following reaction scheme:

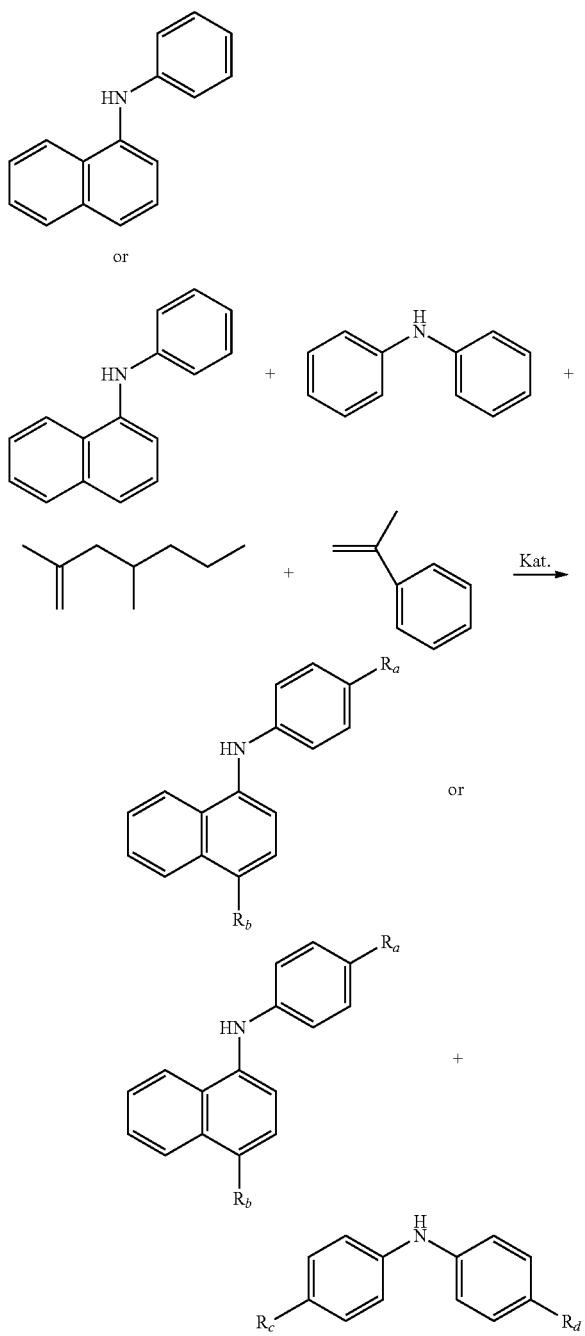

wherein

One of $R_a$ and $R_b$ represents hydrogen or a substituent selected from the group consisting of branched nonyl and 2-phenyl-2-propyl and the other one represents a substituent selected from the group consisting of branched nonyl, 1-phenylethyl and 2-phenyl-2-propyl; and One of $R_c$ and $R_d$ represents hydrogen or a substituent selected from the group consisting of branched nonyl and 2-phenyl-2-propyl and the other one represents a substituent selected from the group consisting of branched nonyl and 2-phenyl-2-propyl.

Suitable acid catalysts in the process variants mentioned above are proton donors (so-called BrØnsted acids), electron acceptor compounds (so-called Lewis acids), cation exchanger resins, aluminosilicates or naturally occurring or modified layered silicates.

Suitable proton donors (so-called BrØnsted acids) are, for example, salt-forming inorganic or organic adds, e.g. mineral acids such as hydrochloric acid, sulphuric acid or phosphoric acid, carboxylic acids, e.g. acetic acid, or sulphonic acids, e.g. methanesulphonic acid, benzenesulphonic acid or p-toluenesulphonic acid.

Suitable electron acceptor compounds (so-called Lewis acids) are, for example, tin tetrachloride, zinc chloride, aluminium chloride or boron trifluoride etherate. Tin tetrachloride and aluminium chloride are particularly suitable.

Suitable cation exchanger resins are, for example, styrene-divinylbenzene copolymers containing sulpho acid groups as ion exchanger function, e.g. the known products Amberlite® and Amberlyst®, of Rohm and Haas, e.g. AMBERLITE 200, or Dowex® 50, of Dow Chemicals, perfluorinated ion exchanger resins, e.g. Nafion® H, of DuPont, or other superacid ion exchanger resins, e.g. those described by T. Yamaguchi in *Applied Catalysis* 61-25 (1990), or M. Hino et al. in *J. Chem. Soc. Chemical Comm.* 1980, 851-852.

Suitable aluminosilicates are, for example, amorphous aluminum silicates which contain about 10-30% of aluminum oxide and about 70-90% of silicon dioxide and which are used in petrochemistry, e.g. aluminum silicate HA-HPV® of Ketjen (Akzo), or crystalline aluminium silicates, e.g. so-called zeolites, which are used as inorganic cation exchangers, as so-called molecular sieves or in the petrochemistry as so-called cracking catalysts, e.g. faujasites, e.g. Zeolite X, e.g. 13X (union Carbide) or SZ-9 (Grace), Zeolite Y, e.g. LZ-82 (Union Carbide), Ultrastable Y Zeolite, e.g. Octacat (Grace), mordenites, e.g. Zeolon 900H® (Norton), or Zeolite Beta, e.g. H-BEA (Südchemie), or Zeolite ZSM-12® (Mobil Oil).

Suitable naturally occurring layered silicates are also called acid earths or days and are e.g. montmorillonites which are activated e.g. with mineral acids, such as sulphuric acid and/or hydrochloric acid, and which preferably have a moisture content of less than 10%, preferably of less than 5%, for example so-called earths or clays of the Fuller type, e.g. the types commercially available under the name Fulcat® (Rockwood Additives), e.g. the types Fulcat 22 B, 220, 230 and 240 (days activated with sulphuric acid), Fulmont® (Rockwood Additives), e.g. the types XMP-4, XMP-3, or acid clays of the types K5, K10, K20 and K30 (activated with hydrochloric acid), KS and KSF (activated with sulphuric acid) or KSF0 (activated with hydrochloric acid and sulphuric acid), of Südchemie, and also days based on bentonite, e.g. products of the types Filtrol® or Retrol® e.g. F-13, F-20 etc. (Engelhard Corp.).

A particularly preferred embodiment of the process is that which comprises using Fulcat® 22 B, an acid-activated montmorillonite containing 4% free moisture and having an acid titer of 20 mg KOH/g.

Modified layered silicates are also called pillared clays and are derived from the above-described naturally occurring layered silicates, containing between the silicate layers oxides of e.g. zirconium, iron, zinc, nickel, chromium, cobalt or magnesium, or rare earth elements. Modified layered silicates have been described, inter alia, by J. Clark et al. in *J. Chem. Soc. Chem. Comm.* 1989, 1353-1354. Particularly preferred modified layered silicates are, for example, the products Envirocat® EPZ-10, EPZG or EPIC produced by Contract Chemicals.

The acid catalyst can be added, for example, in an amount of 1-50, preferably of 5-25, highly preferred of 5-20, percent by weight in respect to the weight amounts of the amine reactants employed or, in the event that a so-called BrØnsted acid or Lewis acid is used, in an amount of 0.002 to 10 mol %, preferably of 0.1 to 5.0 mol % in respect to the weight amounts of the amine reactants.

The reaction in both reaction steps can be carried out with or, preferably, without solvent or diluent. If a solvent is used, it should be inert under the given reaction conditions and should have a suitably high boiling temperature. Suitable solvents are, for example, optionally halogenated hydrocarbons, polar aprotic solvents, liquid amides and alcohols. To be mentioned as examples are: petroleum ether fractions, preferably higher boiling ones, toluene, mesitylene, dichlorobenzene, tetrahydrofuran (THF), dimethylformamide (DMF), dimethylacetamide, (DMA), hexamethylphosphoric acid triamide (HMFPTA), glymes and diglymes, dimethylsulphoxide (DMSO), tetramethylurea (TMU), higher alcohols, such as butanol or ethylene glycol.

Preference is given to products, wherein a molar excess of alkenes per molar amounts of aromatic amine reactants used in the process Is about 1 to 10, preferably about 1.5 to 5 and highly preferred 2-3. With a molar excess of alkenes a product with less than 1% diphenylamine and 1% phenyl-$\alpha$-naphthylamine can be obtained. Products that contain less than 1% DPA and PANA are of low toxicity and, therefore, need no labelling.

According to a preferred embodiment of the invention, the range of the excess amount of nonene combined with either $\alpha$-methyl-styrene or styrene is 1 to 5, preferably 1 to 3, especially 1.5-2 mol. The addition of an additional amount of 0.5 mol styrene or $\alpha$-methyl-styrene reduces the diphenylamine content in the product below 1%. Products that contain less than 1% DPA are of very low toxicity and, therefore, need no labelling.

The products of the process are obtained when the first alkylation step, the alkylation with aliphatic alkenes, is carried out, for example, at a temperature range from 120° to 250° C., especially at a temperature from 150° to 220° C. The reaction temperature in the second reaction step, the alkylation with styrenes, is from about 60° to 250° C., preferably from 110° to 200° C., especially from 110° to 140° C.

The process can be carried out by introducing the starting materials and the acid days, as the catalyst, into a suitable reaction vessel and by heating to the temperatures specified. In an alternative process variant, the tripropylene and the additional alkenes ($\alpha$-methyl-styrene or styrene) may be added to the reaction mixture later. The feed time of the tripropylene is preferably 0.5-10 h and particularly 1-3 h. The reaction is preferably carried out without the addition of organic solvents. The reaction time may amount to several hours, especially in a first step from 5 to 10 h and in a second step from 2-5 h, before a diphenylamine content and phenyl-$\alpha$-naphthylamine-content of less than 1% is reached. This can be determined by taking samples and analytical methods. The reaction is preferably carried out under ambient pressure. Reaction at elevated pressures is possible, for example in an autoclave under a pressure of from 1 to 10 bar absolute pressure.

The acid clays used in the process can be removed from the reaction mixture by filtration, centrifugation or decanting, and are re-usable. In practice, they are used in an amount of from 5.0 to 20.0% by weight, especially from 5.0 to 10.0% by weight in respect to the total amount of the amine reactants. If desired, the mixture is purified in customary manner, for example by distillation.

The product obtained by alkylation with two different alkenes has favourable viscosity characteristics. For example, in an Ubbelohde viscosimeter, low kinematic viscosities of 300-400 mm$^2$/sec at 40° C. are measured (ASTM D 445-94 method, micro-Ubbelohde 2.0-3.0 ml, Ubbelohde factor approx. 5) for alkylated diphenylamine mixtures. That value is lower than in the case of the products produced by alkylation with nonene only, e.g. products obtainable according to the method as disclosed in U.S. Pat. No. 6,315,925, such as the reaction product of 1 mol DPA with 4 mol nonene, which has viscosities from 450-500 mm$^2$/s, or b) the reaction product obtainable according to French Patent Specification 1 508 785, by reaction of DPA with nonene with AlCl$_3$, which has viscosities >550 mm$^2$/s. Moreover, the products alkylated with aluminium chloride as catalyst have intense coloration (Gardner number 9-10), compared to the product alkylated with acid clays with typical Gardner numbers of 2-3.

The following Examples illustrate the invention:
Abbreviations: rpm: Rotations per minute; min: Minute(s); h: Hour(s); RT: Retention Time, GC gas chromatogram;

Area percentages in GC do not exactly add up to 100%. Unknown components not specified.

1 Reaction of diphenylamine with tripropylene and $\alpha$-methylstyrene 1.1 The reaction is carried out in a 300 ml glass reaction vessel equipped with
  Double casing Jacket filled with (heatable high temperature oil) heat transfer fluid
  Reflux cooler equipped with water separator, which is filled with tripropylene before start-up
  Feed unit for tripropylene and $\alpha$-methyl-styrene reactants
  Propeller stirrer
  Temperature indicator
  Sampling device.

The reaction vessel is loaded with 260 g diphenylamine (Duslo), which is melted at a vessel temperature of 80° C. 26.0 g FULCAT 22B (Rockwood Additives) is added under stirring. The reaction vessel is sealed, evacuated to 20 mbar and rinsed with nitrogen for inert conditions. The stirrer speed is set to 500 rpm, and the reaction vessel is heated to 220° C. within 1 h. At this temperature 291.0 g tripropylene (Exxon Europe) is fed to the reaction vessel for 2 h. The reaction mixture begins to boil after 5-10 min from the start of the tripropylene feed. The water adsorbed on the catalyst is distilled off as an azeotrope with tripropylene and removed in a water separator. Due to the constant addition of tripropylene, the boiling point of the reaction mass is reduced by the end of the feed gradually from 220° to 160-165° C. The reaction mixture is kept boiling during the complete feed time by adjusting the jacket temperature 20° C. higher than the temperature of the reaction mixture. By stirring for an additional 2 to 4 h at 160-165° C. the diphenylamine content in the reaction mass is reduced below 10% in respect to the amine content in the reaction mass. The reaction mixture is cooled to 130° C. within 0.5 h. 91 g of $\alpha$-methyl-styrene (Merck) is added at 130° C. within 1 h. During the course of the reaction the temperature of the reaction mixture is increased to 133-134° C. A final content of <1% diphenylamine in respect to the amine content in the reaction mass is obtained during an additional reaction time of 2 h.

The catalyst is allowed to settle in the reactor during 1 h without stirring. The reaction mixture is removed from the top of the reactor by a glass tube. The reaction mixture is filtered through a filter with a pore diameter of approx. 1-3μ. The filtrate is transferred to a distillation vessel without column. The non-converted starting materials tripropylene and $\alpha$-methyl-styrene are distilled off by vacuum distillation at a maximum bottom temperature of 260° C. and a minimum vacuum of 10 mbar. The distillation vessel is cooled to 80° C. and relieved with nitrogen until the atmospheric pressure is reached. About 500 g of a yellow and viscous liquid are obtained. The composition of the final product as determined by capillary column gas chromatography is given below.

1.2 Analytical Results
1.2.1 Capillary column gas chromatography

| | |
|---|---|
| Gas chromatograph | Hewlett Packard HP 6890 |
| Injection method | Direct Injection "On column" |
| Injection volume | 1.0 μl |
| Column | Fused silica, length 15 m, diameter 0.32 mm (J&W) |
| Stationary Phase | Silicon oil (5%-phenyl-methyl-polysiloxan DB-5, film layer 0.25μ |
| Detector | FID (cf. Detection limit) |
| Integration time | 3.0-33.0 min |
| Carrier gas | He (1.6 ml/min) |
| Auxiliary gases | $H_2$ (30 ml/min), air (400 ml/min) |
| Temperatures | |
| Injector | 0.5 min at 100° C., 100° C./min up to 320° C. 30 min at 320° C.; |
| Oven | 1.0 min at 100° C., 10° C./min up to 320° C., 10 min at 320° C.; |
| Detector | 340° C. |
| Evaluation method | By area percent without correction factors |
| Detection limit | 0.05 area % |

TABLE

| Component | Proposed Structure | Molar Mass | RT | Area % of Component in GC |
|---|---|---|---|---|
| Diphenylamine | | 169.23 | 8.2 | 0.81/0.81% |
| 4-Nonyldiphenylamine | Isomer | 295.47 | 13.8 | 1.11/1.11% |
| 4-Nonyldiphenylamine | | 295.47 | 16.1 | 31.60/31.60% |
| 4-α-Methyistyryldiphenylamine | | 287.40 | 17.6 | 7.51/7.51% |
| 4,4'-Dinonyldiphenylamine | Isomer | 421.71 | 19.3 | 1.25/1.29% |
| 4,4'-Dinonyldiphenylamine | | 421.71 | 21.6 | 18.39/18.40% |
| 4-α-Methylstyryl-4'-nonyldiphenylamine | | 413.65 | 23.6 | 30.87/30.85% |

TABLE-continued

| Component | Proposed Structure | Molar Mass | RT | Area % of Component in GC |
|---|---|---|---|---|
| 4,4'-Di-α-methylstyryldiphenyl-amine | | 405.58 | 25.0 | 8.26/8.26% |
| Tri-α-methylstyryldiphenylamine | | 523.76 | 29.5 | <0.05/<0.05% |

1.2.2 Nitrogen content determined with DUMAS method is 3.9%.
1.2.3 Basic nitrogen determined by titration with perchloric acid is 3.75%.
1.2.4 Kinematic Viscosity according to Ubbelohde method at 40° C. is 430 mm2/s
2 Reaction of N-α-naphthyl-N-phenylamine (PANA) with excess at methylstyrene
2.1 A 1000 ml glass reaction vessel equipped with
  Jacket with high temperature oil heating
  Reflux cooler with water separator which is filled with (X-methylstyrene before start-up
  Feed unit for α-methylstyrene
  Propeller stirrer and sampling device
  Temperature indicator
  Vacuum supply and inert gas atmosphere with nitrogen
  is loaded with 403 g PANA (Merck) and 40.3 g FULCAT 22B (Rockwood Additives). The reaction vessel is dosed and evacuated to 20 mbar and flushed with nitrogen. The surrounding temperature is set to 130° C., and the PANA melt is formed at about 80° C. The speed of the stirrer is set to 500 rpm, and the reaction mass is heated to 130° C. within 0.5 h. The water formed on the catalyst is removed above 100° C. into the water separator. After reaching 130° C. 477.8 g α-methylstyrene corresponding to 2.2 mol α-methylstyrene per mol PANA are added during 3 h. Caused by the heat of reaction the inner temperature increases to about 135° C.

After adding the feed the reaction mass is kept at an inner temperature of 130-135° C. for another 3 h. The reaction mass is cooled to 110° C. and filtered to remove the catalyst The remaining α-methylstyrene is distilled off at the maximum bottom temperature of 255° C. at a pressure of 20 mbar. 660 g product is formed with the following composition determined by the GC-analysis.

2.2 Analytical Results
2.2.1 Capillary column gas chromatography

| | |
|---|---|
| Gas chromatograph | Hewlett Packard HP 6890 |
| Injection technique | On column |
| Injection volume | 1.0 μl |
| Column | Fused silica, length: 15 m, diameter: 0.32 mm (J&W) |
| Stationary phase | Silicon oil (5%-phenyl-methyl-polysiloxane, DB-5, film thickness 0.25μ |
| Detector | FID (sensitivity cf. detection limit) |
| Integration | 3.0-36.0 min |
| Carrier gas | He: 1.6 ml/min |
| Auxiliary gases | H$_2$: 30 ml/min, air: 400 ml/min |
| Temperatures | |
| Injector | 0.5 min at 100° C., 100° C./min up to 350° C., 30 min at 350° C.; |
| Oven | 1.0 min at 100° C., 10° C./min up to 350° C., 10 min at 350° C. |
| Detector | 370° C. |
| Duration of cycle | 36 min |
| Sample preparation | 95-115 mg sample in 20 ml toluene |

TABLE

| Components | Prosposed structures by GC/MS | Molar Mass | RT | Area % of Component in GC |
|---|---|---|---|---|
| Dimer of α-methylstyrene | Isomer | 236.36 | 9.0 | 3.51/3.51% |
| Dimer of α-methylstyrene | Isomer | 236.36 | 10.2 | 1.42/1.42% |
| Phenyl-α-naphthylamine | | 219.29 | 13.7 | 0.83/0.83% |
| Mono-α-methylstyryl-phenyl-α-naphthylamine | | 337.47 | 19.1 | 0.17/0.17% |

TABLE-continued

| Components | Prosposed structures by GC/MS | Molar Mass | RT | Area % of Component in GC |
|---|---|---|---|---|
| Mono-α-methylstyryl-phenyl-α-naphthylamine | 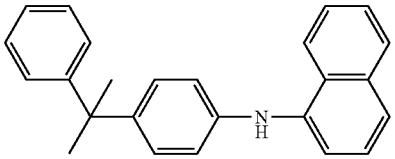 | 337.47 | 20.5 | 0.23/0.23% |
| Mono-α-methylstyryl-phenyl-α-naphthylamine | 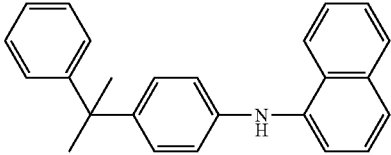 | 337.47 | 21.7 | 70.12/70.10% |
| Di-α-methylstyryl-phenyl-α-naphthylamine | 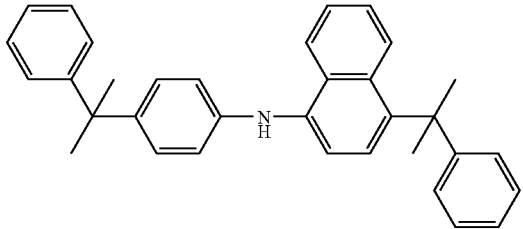 | 455.65 | 24.4 | 0.27/0.27% |
| Di-α-methylstyryl-phenyl-α-naphthylamine | 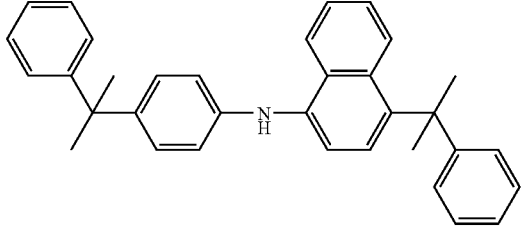 | 455.65 | 24.7 | 0.74/0.74% |
| Di-α-methylstyryl-phenyl-α-naphthylamine | 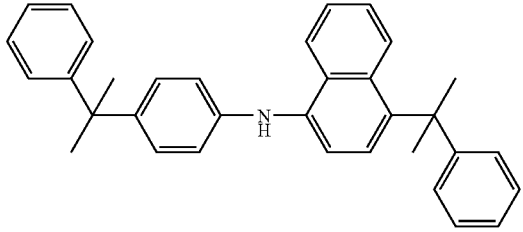 | 455.65 | 26.0 | 0.42/0.42% |
| Di-α-methylstyryl-phenyl-α-naphthylamine | 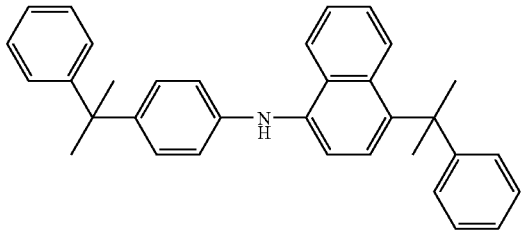 | 455.65 | 26.8 | 13.09/13.09% |
| Di-α-methylstyryl-phenyl-α-naphthylamine | 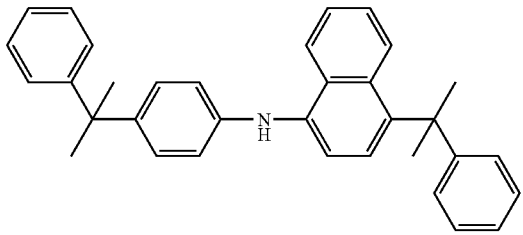 | 455.65 | 26.9 | 0.15/0.15% |

| Components | Prosposed structures by GC/MS | Molar Mass | RT | Area % of Component in GC |
|---|---|---|---|---|
| Tri-α-methylstyryl-phenyl-α-naphthylamine | | 573.82 | 29.5 | 0.90/0.90% | or Isomer 2.2.2 Elemental analysis according to DUMAS method: 89.3% Carbon, 7.0% Hydrogen, 3.4% Nitrogen.
2.2.3 Basic nitrogen by perchloric acid titration: 3.3%
2.2.4 Kinematic viscosity determined by Ubbelohde method at 80° C. 215 mm$^2$/s
3 Reaction of N-α-naphthyl-N-phenylamine (PANA) and diphenylamine (DPA) with tripropylene and α-methylstyrene
3.1 The reaction is carried out in a 1000 ml glass reaction vessel equipped with
  Jacket filled with a heatable high temperature oil
  Reflux cooler equipped with a water separator, which is filled with tripropylene before start-up
  Feed unit for tripropylene and α-methyl-styrene reactants
  Propeller stirrer
  Temperature indicator
  Sampling device.
  The reaction vessel is loaded with 113.4 diphenylamine (DUSLO) and 146.9 g phenyl-α-naphthylamine (Merck). 26.0 g FULCAT 22B (Rockwood Additives) are added under stirring. The reaction vessel is sealed, evacuated to 20 mbar and relieved with nitrogen for inert conditions. The stirrer speed is set to 500 rpm, and the reaction vessel is heated to 220° C. within 1 hour. At this temperature 423 g tripropylene (Exxon Europe) is fed to the reaction vessel during 2 h. The reaction mixture begins to boil after 10 min from the start of the tripropylene feed. The water adsorbed on the catalyst is distilled off as an azeotrope with tripropylene and removed in a water separator. Due to the constantly added tripropylene, the boiling point of the reaction mass is reduced gradually from 220° to 160-165° C. by the end of the feed. The reaction mixture is kept boiling during the complete feed time by adjusting the jacket temperature 20° C. higher than the temperature of the reaction mixture. By stirring for an additional 4 h at 160-165° C. the diphenylamine content in the reaction mass is reduced below 10% in respect to the amine content. The reaction mixture is cooled to 130° C. within 0.5 h. 79 g of α-methylstyrene (Merck) is added at 130° C. within 1 h. During the course of the reaction the temperature of the reaction mixture is increased to 133-134° C. The final content of <1% diphenylamine in respect to the amine content in reaction mass is obtained during an additional reaction time of 2 h.
3.2 Analytical Results
3.2.1 Capillary column gas chromatography

TABLE

| Components | Prosposed Structure in GC/MS | Molar Mass | RT | Area % of Component in GC |
|---|---|---|---|---|
| Diphenylamine | | 169.23 | 8.2 | 0.81/0.81% |
| Dimer of α-methylstyrene | Isomer | 236.36 | 9.4 | <0.05/<0.05% |
| Dimer of α-methylstyrene | Isomer | 236.36 | 10.1 | <0.05/<0.05% |
| Dimer of α-methylstyrene | Isomer | 236.36 | 10.6 | 0.08/0.08% |
| 4-Nonyl-diphenylamine | Isomer | 295.47 | 13.8 | 1.11/1.11% |
| 4-Nonyl-diphenylamine | | 295.47 | 16.1 | 31.60/31.60% |

TABLE-continued

| Components | Proposed Structure in GC/MS | Molar Mass | RT | Area % of Component in GC |
|---|---|---|---|---|
| 4-α-Methylstyrenyl-diphenylamine | | 287.40 | 17.6 | 7.51/7.51% |
| 4-4'-Di-nonyl-diphenylamine | Isomer | 421.71 | 19.3 | 1.25/1.29% |
| 4-4'-Di-nonyl-diphenylamine | | 421.71 | 21.6 | 18.39/18.40% |
| 4-α-Methylstyrene-diphenyl-amine | | 413.65 | 23.6 | 30.87/30.85% |
| 4-'-Di-α-methylstyrene-diphenyl-amine | | 405.58 | 25.0 | 8.26/8.26% |
| Tri-α-methylstyrene-diphenylamine | | 523.76 | 29.5 | <0.05/<0.05% |

3.2.2 Elemental analysis according to DUMAS method: 87.0% carbon, 9.8% hydrogen, 3.6% nitrogen 3.2.3 Basic nitrogen determined by perchloric acid titration: 3.5%

3.2.4 Kinematic viscosity at 80° C., 58 mm²/s

4 Reaction of diphenylamine (DPA) with tripropylene and styrene 4.1 DPA is alkylated with tripropylene and styrene in a manner analogous to Example 1 by reaction of 260 g diphenylamine (DUSLO) and 291 g tripropylene (Exxon Europe) according to Example 1 and addition of 80 g styrene (Merck) at 130° C. within 1 h. During the course of the reaction, the temperature is increased to 133-134° C. A final content of <1% diphenylamine in respect to the amine content in the reaction mass is reached during an additional reaction time of 2 h. The reaction mass is filtered and the excess amount of tripropylene is removed by distillation according to Example 1 at a maximum bottom temperature of 260° C. and 10 mbar absolute pressure. About 492 g of a yellow and viscous liquid are obtained.

4.2 Analytical Results 4.2.1 Capillary column gas chromatography (analytical method cf. Example 1)

TABLE

| Components | Proposed Structures by GC/MS | Molar Mass | RT | Area % of Component in GC |
|---|---|---|---|---|
| Diphenylamine | | 169.23 | 8.3 | 0.36/0.36% |
| Dimer of styrene | Isomer | 208.30 | 9.1 | <0.05/<0.05% |
| Dimer of styrene | Isomer | 208.30 | 9.3 | <0.05/<0.05% |
| Dimer of styrene | Isomer | 208.30 | 10.1 | <0.05/<0.05% |

TABLE-continued

| Components | Proposed Structures by GC/MS | Molar Mass | RT | Area % of Component in GC |
|---|---|---|---|---|
| 2-Nonyl-diphenylamine | | 295.47 | 13.0-14.9 | 1.40/1.41% |
| 2-Styryl-diphenylamine | | 273.38 | 15.2 | 1.92/1.92% |
| 4-Nonyl-diphenylamine | | 295.47 | 15.3-17.1 | 39.97/40.03% |
| 4-Styryl-diphenylamine | | 273.38 | 17.3 | 5.14/5.15% |
| 2,2'-Di-nonyl-diphenylamine | | 421.71 | 17.8-19.4 | 0.38/0.38% |
| 2-Styryl-2'-nonyl-diphenylamine | | 399.62 | 19.4-20.5 | 5.66 5.65% |

TABLE-continued
| Components | Proposed Structures by GC/MS | Molar Mass | RT | Area % of Component in GC |
|---|---|---|---|---|
| 2-Styryl-4'-nonyl-diphenylamine + 2,2'-Di-styryl-diphenylamine | 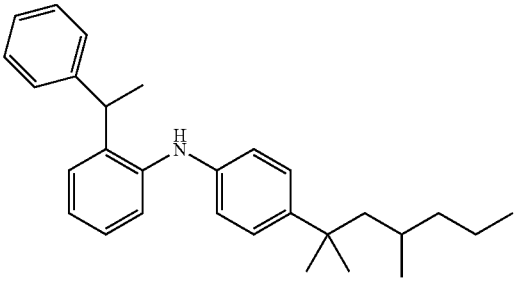 + 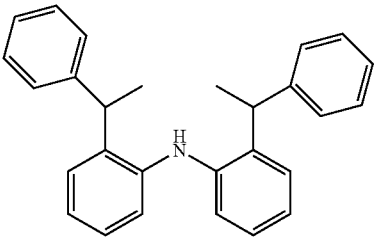 | 399.62+ 377.53 | 20.5- 21.5 | 9.70/9.70% |
| 4,4'-Di-nonyl-diphenylamine + 2,4'-Di-styryl-diphenylamine | 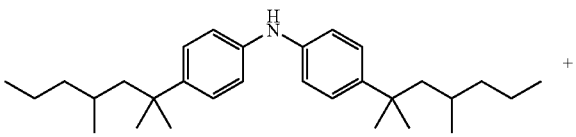 + 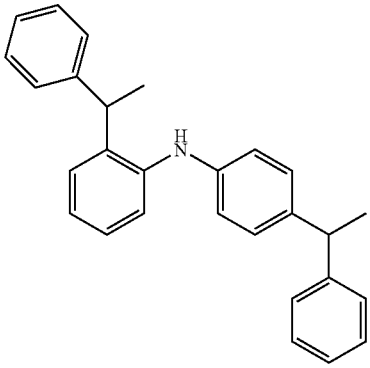 | 421.71+ 377.53 | 21.5- 22.7 | 17.34/17.30% |
| 4-Styryl-4'-nonyl-diphenylamine | 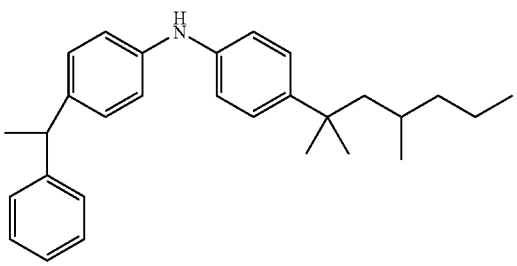 | 399.62 | 22.7- 24.0 | 6.89/6.87% |
| 4,4'-Di-styryl-diphenylamine | 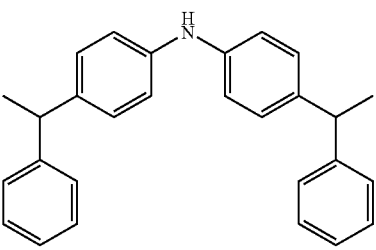 | 377.53 | 24.2 | 5.11/5.11% |

TABLE-continued

| Components | Proposed Structures by GC/MS | Molar Mass | RT | Area % of Component in GC |
|---|---|---|---|---|
| Di-nonyl-styryl-diphenylamine | or Isomer | 525.86 | 24.3-25.1 | 2.19/2.19% |
| Nonyl-di-styryl-diphenylamine | or Isomer | 503.68 | 25.2-26.2 | 1.45/1.44% |
| 2,4,4'-Tri-styryl-diphenylamine | | 481.68 | 26.8 | 2.24/2.25% |

Remarks: Some groups were not separated with the proposed gas chromatographic method.

4.2.2 Elemental analysis according to DUMAS method: 85% carbon, 9.6% hydrogen, 4.2% nitrogen 4.2.3 Basic nitrogen determined by perchloric acid titration: 4.1%

4.2.4 Kinematic viscosity determined according to Ubbelohde method at 40° C. is 277 mm$^2$/s 5 Application Results

TABLE 1

| | Tests | | | | |
|---|---|---|---|---|---|
| Formulation | 1 | 2 | 3 | 4 | 5 |
| Base Formulation[1] | Bal. | Bal. | Bal. | Bal. | Bal. |
| PANA | 1.5 | — | — | — | — |
| IRGANOX L01[2] | 1.5 | — | — | — | — |
| Reaction Product. Example 2[3] [APAN] | — | 1.5 | 1.2 | 1.0 | 0.8 |
| IRGANOX L67[4] [ADPA] | — | 1.5 | 1.8 | 2.0 | 2.2 |
| Ratio APAN:ADPA | 50:50 | 50:50 | 40:60 | 35:65 | 25:75 |
| Δ TAN[5] | 1.59 | 1.62 | 2.19 | 3.43 | 0.86 |
| Δ% Visc[6] 40° C. | 23.8 | 20.1 | 23.6 | 23.3 | 25.5 |
| Sludge[7] [mg] | 4.7 | 6.3 | 4.7 | 6.6 | 8.3 |
| Δ Cu[8] [mg/cm$^2$] | 0.16 | −0.04 | −0.07 | −0.10 | −0.04 |

The mixtures are obtained by magnetic (bar) stirring on a hot plate at 60° C.

[1]Base Formulation in oil comprising 2% triaryl phosphate and 0.1% triazole metal deactivator in a synthetic pentaerythritol ester

[2]IRGANOX L01: 4,4'-di-tert-octyldiphenylamine

[3]Reaction product of N-α-naphthyl-N-phenylamine (PANA) with excess α-methylstyrene

[4]Nonylated (mono/di/tri) diphenylamine

[5]TAN: Total Acid Number. ASTM D 664 potentiometric titration procedure

[6]Δ% Visc 40° C.: Viscosity is measured per ASTM D 445 Kinematic viscosity procedure at 40° C.

[7]Sludge is determined by filtering the tested oil through pre-dried and pre-weighed Whatman No. 41 filter papers

[8]Copper corrosion is determined by the weight loss of the copper coupon. After the test, the copper coupon is washed and wiped with cotton balls soaked in n-heptane. The coupon is dried, weighed to the nearest 0.1 mg and the dimensions of the coupon are measured to the nearest 0.1 cm. The corrosion is reported in mg/cm$^2$. Weight changes of steel, silver, aluminum and magnesium coupons are neglegible.

Application Results

TABLE 2

| Formulation | Tests | | |
|---|---|---|---|
| | 1 | 2 | 3 |
| Base Formulation[1] | Bal. | Bal. | Bal. |
| PANA | 1.5 | — | — |
| IRGANOX L01[2] | 1.5 | — | — |
| IRGANOX L57[9] | — | 1.5 | — |
| NAUGALUBE APAN[10] | — | 1.5 | — |
| Reaction Product Example 3 | — | — | 3.0 |
| Δ TAN[5] | 1.59 | 0.60 | 0.96 |
| Δ% Visc[6] 40° C. | 23.8 | 24.6 | 20.0 |
| Sludge[7] [mg] | 4.7 | 34.7 | 2.3 |
| Δ Cu[8] [mg/cm$^2$] | 0.16 | −0.04 | −0.02 |

The mixtures are obtained by magnetic (bar) stirring on a hot plate at 60° C.
[1]-[8] cf. Example 5
[9] IRGANOX L57: alkylated (tert-butyl, branched octyl) diphenylamine
[10] NAUGALUBE APAN: PANA alkylated with tetrapropylene

The invention claimed is:
1. A composition consisting essentially of
  A) An additive mixture consisting essentially of
    a) At least one compound:

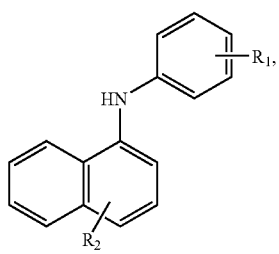

(I)

wherein one of $R_1$ and $R_2$ independently of one another represents hydrogen or a hydrocarbon radical selected from the group consisting of branched nonyl, 1-phenylethyl and 2-phenyl-2-propyl and the other one represents a hydrocarbon radical selected from the group consisting of branched nonyl, 1-phenylethyl and 2-phenyl-2-propyl; and
    b) At least one compound:

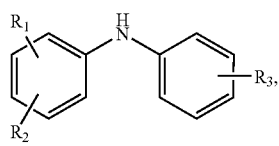

(II)

wherein $R_1$ and $R_2$ independently of one another represent hydrogen or a hydrocarbon radical selected from the group consisting of tert-butyl, branched octyl, branched nonyl, 1-phenylethyl and 2-phenyl-2-propyl; and $R_3$ represents a hydrocarbon radical selected from the group consisting of tert-butyl, branched octyl, branched nonyl, 1-phenylethyl and 2-phenyl-2-propyl; and
  B) A base oil of lubricating viscosity which is susceptible to oxidative, thermal or light induced degradation.
2. A composition consisting essentially of
  A) An additive mixture consisting essentially of which essentially consists of
    a) At least one compound:

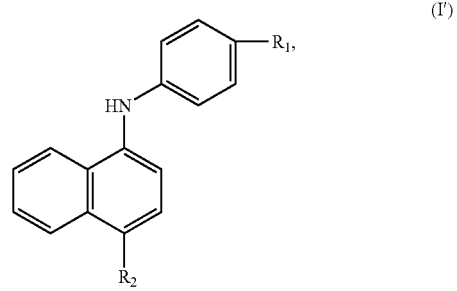

(I')

wherein one of $R_1$ and $R_2$ independently of one another represents hydrogen or a hydrocarbon radical selected from the group consisting of branched nonyl, 1-phenylethyl and 2-phenyl-2-propyl and the other one represents a hydrocarbon radical selected from the group consisting of branched nonyl, 1-phenylethyl and 2-phenyl-2-propyl or an isomer thereof; and
    b) At least one compound:

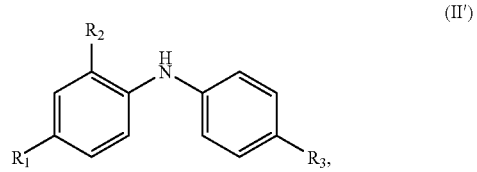

(II')

wherein $R_1$ and $R_2$ independently of one another represent hydrogen or a hydrocarbon radical selected from the group consisting of tert-butyl, branched octyl, branched nonyl, 1-phenylethyl and 2-phenyl-2-propyl; and $R_3$ represents a hydrocarbon radical selected from the group consisting of tert-butyl, branched octyl, branched nonyl, 1-phenylethyl and 2-phenyl-2-propyl or an isomer thereof; and
  B) A base oil of lubricating viscosity which is susceptible to oxidative, thermal or light induced degradation.
3. A composition according to claim 2, wherein the additive mixture has
  a) At least one compound (I'), wherein one of $R_1$ and $R_2$ independently of one another represents hydrogen or a hydrocarbon radical selected from the group consisting of 2,4-dimethyl-2-heptyl, 1-phenylethyl and 2-phenyl-2-propyl and the other one represents a hydrocarbon radical selected from the group consisting of 2,4-dimethyl-2-heptyl, 1-phenylethyl and 2-phenyl-2-propyl; and
  b) At least one compound (II'), wherein $R_1$ and $R_2$ independently of one another represent hydrogen or a hydrocarbon radical selected from the group consisting of tert-butyl, 2,4,4-trimethyl-2-pentyl, 2,4-dimethyl-2-heptyl, 1-phenylethyl and 2-phenyl-2-propyl; and $R_3$ represents a hydrocarbon radical selected from the group consisting of tert-butyl, 2,4,4-trimethyl-2-pentyl, 2,4-dimethyl-2-heptyl, 1-phenylethyl and 2-phenyl-2-propyl.
4. A composition according to claim 2, wherein the additive mixture has
  a) At least one compound (I'), wherein one of $R_1$ and $R_2$ independently of one another represents hydrogen or a hydrocarbon radical selected from the group consisting of 2,4-dimethyl-2-heptyl and 2-phenyl-2-propyl and the other one represents a hydrocarbon radical selected from the group consisting of 2,4-dimethyl-2-heptyl and 2-phenyl-2-propyl; and b) At least one compound (II'), wherein $R_1$ and $R_2$ independently of one another represent hydrogen or a hydrocarbon radical selected from the group consisting of tert-butyl, 2,4,4-trimethylpent-2-yl, 2,4-dimethyl-2-heptyl and 2-phenyl-2-propyl; and $R_3$ represents a hydrocarbon radical selected from the group consisting of tert-butyl, 2,4,4-trimethylpent-2-yl, 2,4-dimethyl-2-heptyl and 2-phenyl-2-propyl.

5. A composition according to claim 2, wherein the additive mixture has a) At least one compound (I'), wherein one of $R_1$ and $R_2$ independently of one another represents hydrogen or a hydrocarbon radical selected from the group consisting of 2,4-dimethyl-2-heptyl and 2-phenyl-2-propyl and the other one represents a hydrocarbon radical selected from the group consisting of 2,4-dimethyl-2-heptyl and 2-phenyl-2-propyl; and b) At least one compound (II'), wherein $R_1$ and $R_2$ independently of one another represent hydrogen or a hydrocarbon radical selected from the group consisting of 2,4-dimethyl-2-heptyl and 2-phenyl-2-propyl; and $R_3$ represents a hydrocarbon radical selected from the group consisting of 2,4-dimethyl-2-heptyl and 2-phenyl-2-propyl.

6. A composition according to claim 1, wherein the base oil of lubricating viscosity of component B) is a natural, semi-synthetic or synthetic polymer or a functional fluid.

7. A composition according to claim 6, wherein the functional fluid is a lubricant, machining fluid, motor oil, turbine oil, gear oil, metal-working fluid or a hydraulic fluid.

8. A composition according to claim 1, which additionally contains conventional additives suitable for protecting a base oil of lubricating viscosity which is susceptible to oxidative, thermal and light induced degradation.

9. An additive mixture consisting essentially of a) At least one compound

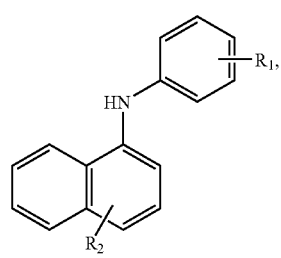

(I)

wherein one of $R_1$ and $R_2$ independently of one another represents hydrogen or a hydrocarbon radical selected from the group consisting of branched nonyl, 1-phenylethyl and 2-phenyl-2-propyl and the other one represents a hydrocarbon radical selected from the group consisting of branched nonyl, 1-phenylethyl and 2-phenyl-2-propyl; and b) At least one compound

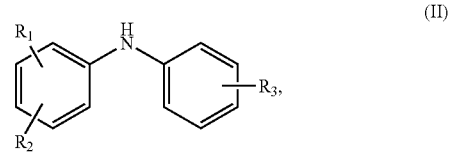

(II)

wherein $R_1$ and $R_2$ independently of one another represent hydrogen or a hydrocarbon radical selected from the group consisting of tert-butyl, branched octyl, branched nonyl, 1-phenylethyl and 2-phenyl-2-propyl; and $R_3$ represents a hydrocarbon radical selected from the group consisting of tert-butyl, branched octyl, branched nonyl, 1-phenylethyl and 2-phenyl-2-propyl.

10. A process for stabilizing a base oil of lubricating viscosity, which process comprises adding or applying to the base oil an additive mixture according to claim 1.

11. A process for preparing an additive mixture according to claim 1, which process comprises alkylating N-α-naphthyl-N-phenylamine (PANA) or a mixture of PANA and diphenylamine with nonene or a mixture of isomeric nonenes in the presence of styrene or α-methylstyrene and an acidic catalyst and adding to the reaction mixture a compound (II) wherein $R_1$ and $R_2$ independently of one another represent hydrogen or a hydrocarbon radical selected from the group consisting of tert-butyl and branched octyl and $R_3$ represents branched octyl.

12. A process for preparing an additive mixture according to claim 1, which process comprises alkylating N-α-naphthyl-N-phenylamine (PANA) with nonene or a mixture of isomeric nonenes in the presence of α-methylstyrene and an acidic catalyst and adding to the reaction mixture a compound (II) or a mixture of the compound (II), wherein $R_1$ and $R_2$ independently of one another represent hydrogen or a hydrocarbon radical selected from the group consisting of tert-butyl, branched octyl and branched nonyl and $R_3$ represents a hydrocarbon radical selected from the group consisting of tert-butyl, branched octyl and branched nonyl.

13. A process for the preparation of a mixture comprising at least one compound (I) according to claim 1, wherein one of $R_1$ and $R_2$ independently of one another represents hydrogen or a hydrocarbon radical selected from the group consisting of branched nonyl, 1-phenylethyl and 2-phenyl-2-propyl and the other one represents a hydrocarbon radical selected from the group consisting of branched nonyl, 1-phenylethyl and 2-phenyl-2-propyl, which process comprises alkylating N-α-naphthyl-N-phenylamine (PANA) with nonene or a mixture of isomeric nonenes in the presence of styrene or α-methylstyrene and an acidic catalyst.

14. A process for the preparation of a mixture comprising at least one compound (I) according to claim 1, wherein one of $R_1$ and $R_2$ independently of one another represents hydrogen or a hydrocarbon radical selected from the group consisting of branched nonyl, 1-phenylethyl and 2-phenyl-2-propyl and the other one represents a hydrocarbon radical selected from the group consisting of branched nonyl, 1-phenylethyl and 2-phenyl-2-propyl; and at least one compound (II) according to claim 1, wherein $R_1$ and $R_2$ independently of one another represent hydrogen or a hydrocarbon radical selected from the group consisting of branched nonyl, 1-phenylethyl and 2-phenyl-2-propyl; and $R_3$ represents a hydrocarbon radical selected from the group consisting of branched nonyl, 1-phenylethyl and 2-phenyl-2-propyl, which process comprises alkylating N-α-naphthyl-N-phenylamine (PANA) or a mixture of PANA and diphenylamine with nonene or a mixture of isomeric nonenes in the presence of styrene or α-methylstyrene and an acidic catalyst.

15. A process for the preparation of a mixture comprising at least one compound (I) according to claim 1, wherein one of $R_1$ and $R_2$ independently of one another represents hydrogen or a hydrocarbon radical selected from the group consisting of branched nonyl and 2-phenyl-2-propyl and the other one represents a hydrocarbon radical selected from the group consisting of branched nonyl and 2-phenyl-2-propyl, which process comprises alkylating N-α-naphthyl-N-phenylamine (PANA) with nonene or a mixture of isomeric nonenes in the presence of α-methylstyrene and an acidic catalyst.

16. A process for the preparation of a mixture comprising at least one compound (I) according to claim 1, wherein one of $R_1$ and $R_2$ independently of one another represents hydrogen or a hydrocarbon radical selected from the group consisting of branched nonyl and 2-phenyl-2-propyl and the other one represents a hydrocarbon radical selected from the group consisting of branched nonyl and 2-phenyl-2-propyl; and at least one compound (II) according to claim 1, wherein $R_1$ and $R_2$ independently of one another represent hydrogen or a hydrocarbon radical selected from the group consisting of branched nonyl and 2-phenyl-2-propyl; and $R_3$ represents a hydrocarbon radical selected from the group consisting of branched nonyl and 2-phenyl-2-propyl, which process comprises alkylating N-α-naphthyl-N-phenylamine (PANA) or diphenylamine with nonene or a mixture of isomeric nonenes in the presence of α-methylstyrene and an acidic catalyst.

\* \* \* \* \*